US009151540B2

(12) United States Patent
Matter, III et al.

(10) Patent No.: US 9,151,540 B2
(45) Date of Patent: Oct. 6, 2015

(54) MULTICHANNEL HEAT EXCHANGER TUBES WITH FLOW PATH INLET SECTIONS

(75) Inventors: Jerome Anthony Matter, III, Racine, WI (US); Jeffrey Lee Tucker, Wichita, KS (US)

(73) Assignee: Johnson Controls Technology Company, Holland, MI (US)

( * ) Notice: Subject to any disclaimer, the term of this patent is extended or adjusted under 35 U.S.C. 154(b) by 1054 days.

(21) Appl. No.: 13/170,066

(22) Filed: Jun. 27, 2011

(65) Prior Publication Data

US 2011/0315364 A1 Dec. 29, 2011

Related U.S. Application Data

(60) Provisional application No. 61/359,523, filed on Jun. 29, 2010.

(51) Int. Cl.
*F28F 1/02* (2006.01)
*F28F 9/00* (2006.01)
*F28F 9/02* (2006.01)
*F28D 1/053* (2006.01)
(Continued)

(52) U.S. Cl.
CPC .......... *F28D 1/05383* (2013.01); *B21C 37/151* (2013.01); *B21C 37/157* (2013.01); *F28F 1/022* (2013.01); *F28F 1/025* (2013.01); *F28F 9/0273* (2013.01); *F28F 9/0278* (2013.01); *Y10T 29/49391* (2015.01)

(58) Field of Classification Search
CPC ............. F28F 1/025; F28F 1/02; F28F 1/022; F28F 9/00; F28F 9/02; F28F 9/039; F28F 9/028; F28F 9/0282; F28F 9/0182; F28F 9/026; F28F 9/0239; F28F 9/182; F25B 39/04
USPC .......... 165/183, 172–179, 150, 152, 153, 144
See application file for complete search history.

(56) References Cited

U.S. PATENT DOCUMENTS 1,991,631 A * 2/1935 Sangster ........................ 165/174
2,858,111 A * 10/1958 Aydelott et al. ............. 165/134.1
(Continued)

FOREIGN PATENT DOCUMENTS

DE           10300054 A1 * 7/2003 ................ F28F 9/02
DE    102009058069 A1 * 6/2011
(Continued)

*Primary Examiner* — Allen Flanigan
*Assistant Examiner* — For K Ling
(74) *Attorney, Agent, or Firm* — Fletcher Yoder, P.C.

(57) ABSTRACT

The present disclosure is directed to multichannel tubes with flow path inlet sections that allow refrigerant to enter the flow paths through an outer wall of the multichannel tubes. In certain embodiments, a portion of the outer wall is removed to expose the flow paths to a distribution chamber within an inlet manifold divided into an inlet section and a distribution section by a distributor. According to certain embodiments, the inlet section may be designed to have a relatively small cross-sectional area that promotes mixed phase flow of liquid and vapor refrigerant. The multichannel tubes extend into the distribution section to partition the distribution section into a series of distribution chambers defined by a pair of adjacent tubes, the distributor, and the inlet manifold. Within each distribution chamber, the refrigerant may be directed into the multichannel tubes through the flow path inlet sections of the multichannel tubes.

9 Claims, 15 Drawing Sheets

(51) Int. Cl.
*B21C 37/15* (2006.01)
*F25B 39/04* (2006.01)

(56) References Cited

U.S. PATENT DOCUMENTS

| | | | |
|---|---|---|---|
| 4,960,169 A * | 10/1990 | Granetzke | 165/173 |
| 4,971,145 A | 11/1990 | Lyon | |
| 5,152,339 A | 10/1992 | Calleson | |
| 5,172,761 A | 12/1992 | Lyon | |
| 5,174,373 A | 12/1992 | Shinmura | |
| 5,203,407 A | 4/1993 | Nagasaka | |
| 5,214,847 A | 6/1993 | Aoki | |
| 5,214,848 A | 6/1993 | Lelievre | |
| 5,233,756 A | 8/1993 | le Gauyer | |
| 5,251,692 A | 10/1993 | Haussmann | |
| 5,299,635 A * | 4/1994 | Abraham | 165/173 |
| 5,318,111 A * | 6/1994 | Young et al. | 165/150 |
| 5,323,851 A | 6/1994 | Abraham | |
| 5,368,097 A | 11/1994 | Chiba et al. | |
| 5,400,853 A | 3/1995 | Wolters | |
| 5,479,985 A * | 1/1996 | Yamamoto et al. | 165/176 |
| 5,540,278 A * | 7/1996 | Chiba et al. | 165/175 |
| 5,690,166 A | 11/1997 | Yamaguchi | |
| 5,704,415 A * | 1/1998 | Suzuki et al. | 165/104.26 |
| 5,727,626 A | 3/1998 | Kato | |
| 5,941,303 A | 8/1999 | Gowan et al. | |
| 6,073,686 A * | 6/2000 | Park et al. | 165/144 |
| 6,142,217 A | 11/2000 | Haussmann | |
| 6,357,520 B1 | 3/2002 | Kato et al. | |
| 6,732,789 B2 | 5/2004 | Jang | |
| 6,827,139 B2 | 12/2004 | Kawakubo et al. | |
| 7,044,209 B2 | 5/2006 | Petersen | |
| 7,275,394 B2 | 10/2007 | Lundberg | |
| 7,337,834 B2 | 3/2008 | Antonijevic et al. | |
| 7,367,388 B2 * | 5/2008 | Yagisawa | 165/174 |
| 7,398,819 B2 | 7/2008 | Taras et al. | |
| 7,418,999 B2 | 9/2008 | Takano | |
| 7,472,744 B2 | 1/2009 | Gorbounov et al. | |
| 7,481,266 B2 | 1/2009 | Demuth et al. | |
| 7,484,555 B2 | 2/2009 | Beamer et al. | |
| 7,527,089 B2 | 5/2009 | Gorbounov et al. | |
| 7,562,697 B2 * | 7/2009 | Gorbounov et al. | 165/174 |
| 7,775,067 B2 | 8/2010 | Ichiyanagi | |
| 7,819,177 B2 | 10/2010 | Beamer et al. | |
| 7,931,073 B2 | 4/2011 | Gorbounov et al. | |
| 2006/0131009 A1 | 6/2006 | Nies | |
| 2008/0023183 A1 | 1/2008 | Beamer et al. | |
| 2008/0023184 A1 | 1/2008 | Beamer et al. | |
| 2008/0023185 A1 | 1/2008 | Beamer et al. | |
| 2008/0093062 A1 | 4/2008 | Gorbounov et al. | |
| 2008/0105420 A1 | 5/2008 | Taras et al. | |
| 2009/0095458 A1 | 4/2009 | Lim et al. | |
| 2009/0126920 A1 | 5/2009 | Demuth et al. | |
| 2009/0173482 A1 | 7/2009 | Beamer et al. | |
| 2010/0089095 A1 | 4/2010 | Macri et al. | |
| 2010/0089559 A1 | 4/2010 | Gorbounov et al. | |
| 2010/0206535 A1 | 8/2010 | Munoz et al. | |
| 2010/0282454 A1 | 11/2010 | Jiang et al. | |
| 2010/0319894 A1 | 12/2010 | Biver et al. | |

FOREIGN PATENT DOCUMENTS

| | | |
|---|---|---|
| EP | 1557630 A1 * | 7/2005 |
| JP | 2004198021 A * | 7/2004 |
| WO | WO2009022575 | 2/2009 |

* cited by examiner

MULTICHANNEL HEAT EXCHANGER TUBES WITH FLOW PATH INLET SECTIONS

CROSS REFERENCE TO RELATED APPLICATIONS

This application claims priority from and the benefit of U.S. Provisional Application Ser. No. 61/359,523, entitled "MULTICHANNEL HEAT EXCHANGER TUBES WITH FLOW PATH INLET SECTIONS", filed Jun. 29, 2010, which is hereby incorporated by reference.

BACKGROUND

The invention relates generally to multichannel tubes with flow path inlet sections.

Heat exchangers are used in heating, ventilation, air conditioning, and refrigeration (HVAC&R) systems. Multichannel heat exchangers generally include multichannel tubes for flowing refrigerant through the heat exchanger between manifolds that are connected to a refrigerant inlet and a refrigerant outlet. Each multichannel tube may contain several individual flow paths. As a fluid, such as refrigerant, flows through the flow paths, the fluid may exchange heat with an external fluid, such as air, flowing between the multichannel tubes. Multichannel tubes may be used in heat exchangers of small tonnage systems, such as residential systems, or in large tonnage systems, such as industrial chiller systems, as well as in vehicle air conditioners, and refrigeration devices of various types.

In general, heat exchangers transfer heat by circulating a refrigerant through a cycle of evaporation and condensation. In many systems, the refrigerant changes phases while flowing through heat exchangers in which evaporation and condensation occur. For example, the refrigerant may enter an evaporator heat exchanger as a liquid and exit as a vapor. In another example, the refrigerant may enter a condenser heat exchanger as a vapor and exit as a liquid. Generally, a portion of the heat transfer is achieved from the phase change that occurs within the heat exchangers. That is, while some energy is transferred to and from the refrigerant by changes in the temperature of the fluid (i.e., sensible heat), more energy is exchanged by phase changes (i.e., latent heat). For example, in the case of an evaporator, the external air is cooled when the liquid refrigerant flowing through the heat exchanger absorbs heat from the air causing the liquid refrigerant to change to a vapor.

In a refrigeration system, an expansion device is located in a closed loop prior to the evaporator. The expansion device lowers the temperature and pressure of the refrigerant by increasing its volume. However, during the expansion process, some of the liquid refrigerant may be expanded to form vapor. Therefore, a mixture of liquid and vapor refrigerant typically enters the evaporator. Because the vapor refrigerant has a lower density than the liquid refrigerant, the vapor refrigerant tends to separate from the liquid refrigerant resulting in some multichannel flow paths receiving mostly vapor. Further, in heat exchangers containing vertical manifolds, gravity may promote separation of the liquid and vapor refrigerant. The tubes containing primarily vapor are not able to absorb much heat, which may result in less efficient heat transfer.

SUMMARY

The present invention relates to a heat exchanger tube that includes at least one flow path extending along a length of the heat exchanger tube from a first end to a second end opposite of the first end, a fluid flow section in which the at least one flow path is enclosed within the heat exchanger tube, and an inlet section in which only a portion of an outer wall of the heat exchanger tube surrounds the at least one flow path along the length of the flow path to allow fluid to flow into or out of the at least one flow path through a length of the flow path not surrounded by the outer wall. The inlet section is spaced from the first end and the second end.

The present invention also relates to a heat exchanger tube that includes a top wall, a bottom wall disposed generally opposite from the top wall, and a pair of side walls extending between the top and bottom walls and separated by a width of the heat exchanger tube. The heat exchanger tube also includes a plurality of generally parallel flow paths spaced from one another along the width and extending along a length of the heat exchanger tube from a first end to a second end opposite of the first end, where the plurality of generally parallel flow paths are enclosed by the top wall, the bottom wall, and the side walls. The heat exchanger tube further includes an inlet section that has a first section in which the top wall is removed along the width to expose the plurality of generally parallel flow paths within the inlet section and a second section in which the bottom wall is removed along the width to expose the plurality of generally parallel flow paths within the inlet section.

The present invention further relates to a heat exchanger tube that includes a top wall, a bottom wall disposed generally opposite from the top wall, and a pair of side walls extending between the top and bottom walls and separated by a width of the heat exchanger tube. The heat exchanger tube also includes a plurality of generally parallel flow paths spaced from one another along the width and extending along a length of the heat exchanger tube from a first end to a second end opposite of the first end, where the plurality of generally parallel flow paths are enclosed by the top wall, the bottom wall, and the side walls, and are separated from one another by partitions extending along the length. The heat exchanger tube further includes an inlet section that has a slanted tube end where the bottom wall extends past the top wall. The partitions include angled ends that connect the bottom wall to the top wall within the inlet section.

The present invention further relates to a method of making a heat exchanger, where the method includes, in a heat exchanger tube having a plurality of generally parallel flow paths extending between opposite ends, removing a section of an outer wall along the length of the tube to expose at least some of the plurality of generally parallel flow paths.

DRAWINGS

DETAILED DESCRIPTION

The present disclosure is directed to multichannel tubes with flow path inlet sections that allow refrigerant to enter the flow paths through an outer wall of the multichannel tubes, rather than through an end of the multichannel tubes. For example, a portion of the top and/or bottom wall may be removed to expose the flow paths to a distribution section within an inlet manifold. The multichannel tubes with flow path inlet sections may be particularly well-suited for use in heat exchangers with vertical manifolds.

According to certain embodiments, the multichannel tubes may be employed in inlet manifolds that include a distributor that longitudinally partitions the inlet manifold into an inlet section and a distribution section. For example, the distributor may be a plate that divides the inlet manifold into the inlet section and the distribution section. Refrigerant may enter the inlet manifold through the inlet section where the refrigerant may be distributed along the length of the inlet manifold. According to certain embodiments, the inlet section may be designed to have a relatively small cross-sectional area that promotes mixed phase flow of liquid and vapor refrigerant. Orifices within the distributor may meter the flow of refrigerant from the inlet section to the distribution section.

The distribution section includes a plurality of distribution chambers designed to direct refrigerant into the multichannel tubes. For example, in certain embodiments, each distribution chamber may be designed to direct refrigerant into a different multichannel tube. The metering of refrigerant from the inlet section to distribution chambers may be designed to promote a more even distribution of liquid refrigerant to some or all of the multichannel tubes, and may inhibit the preferential flow of liquid refrigerant to certain multichannel tubes. The distribution chambers are at least partially formed by the tubes. For example, the multichannel tubes may extend into the distribution section to abut the distributor and partition the distribution section into a series of distribution chambers defined by a pair of adjacent tubes, the distributor, and a portion of the inlet manifold. According to certain embodiments, each orifice may align with a different distribution chamber. Within each distribution chamber, the refrigerant may be directed into the multichannel tubes through the flow path inlet sections of the multichannel tubes.

Figure 1:
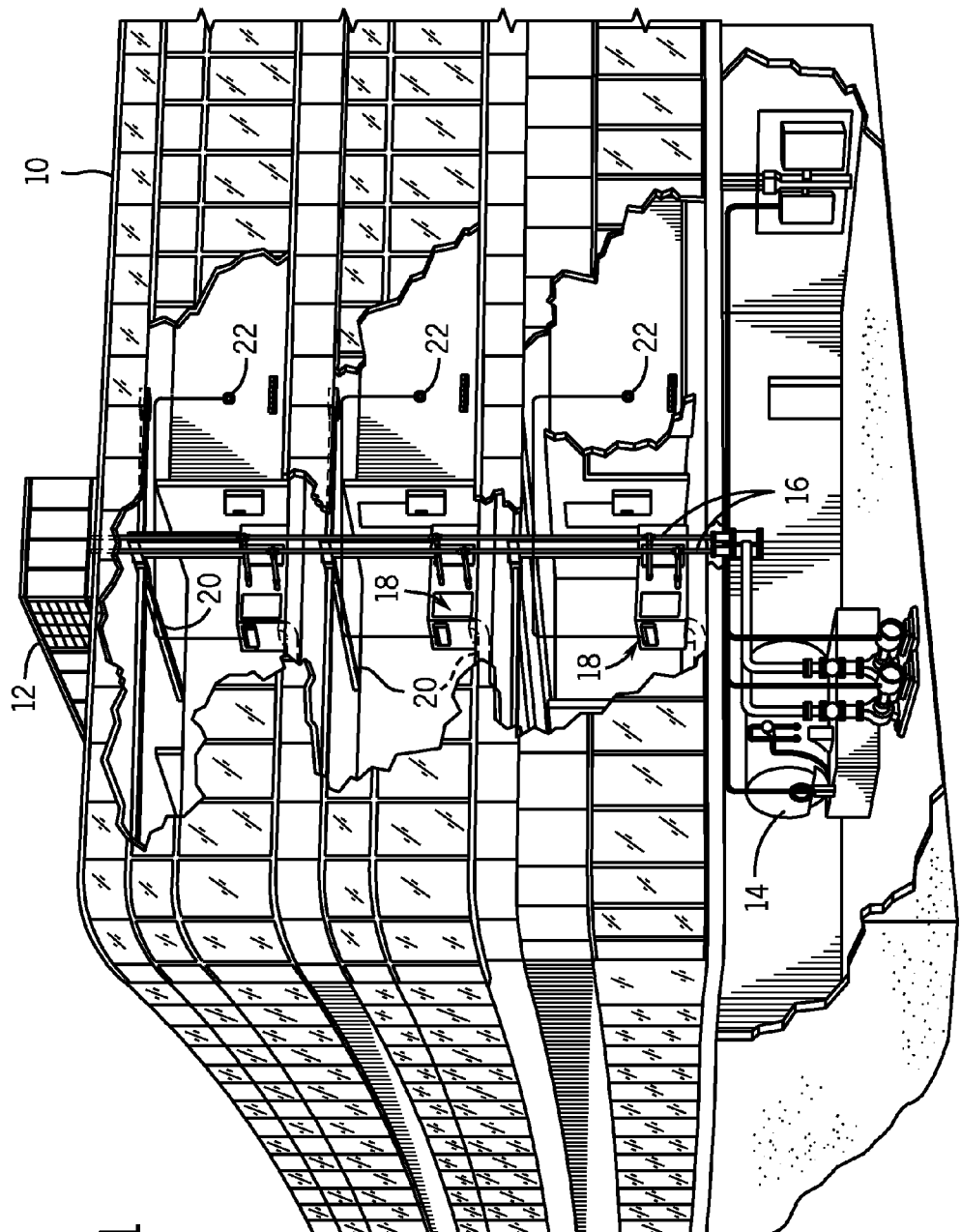
FIG. 1 is an illustration of an embodiment of a commercial or industrial HVAC&R system that employs heat exchangers.
Figure 2:
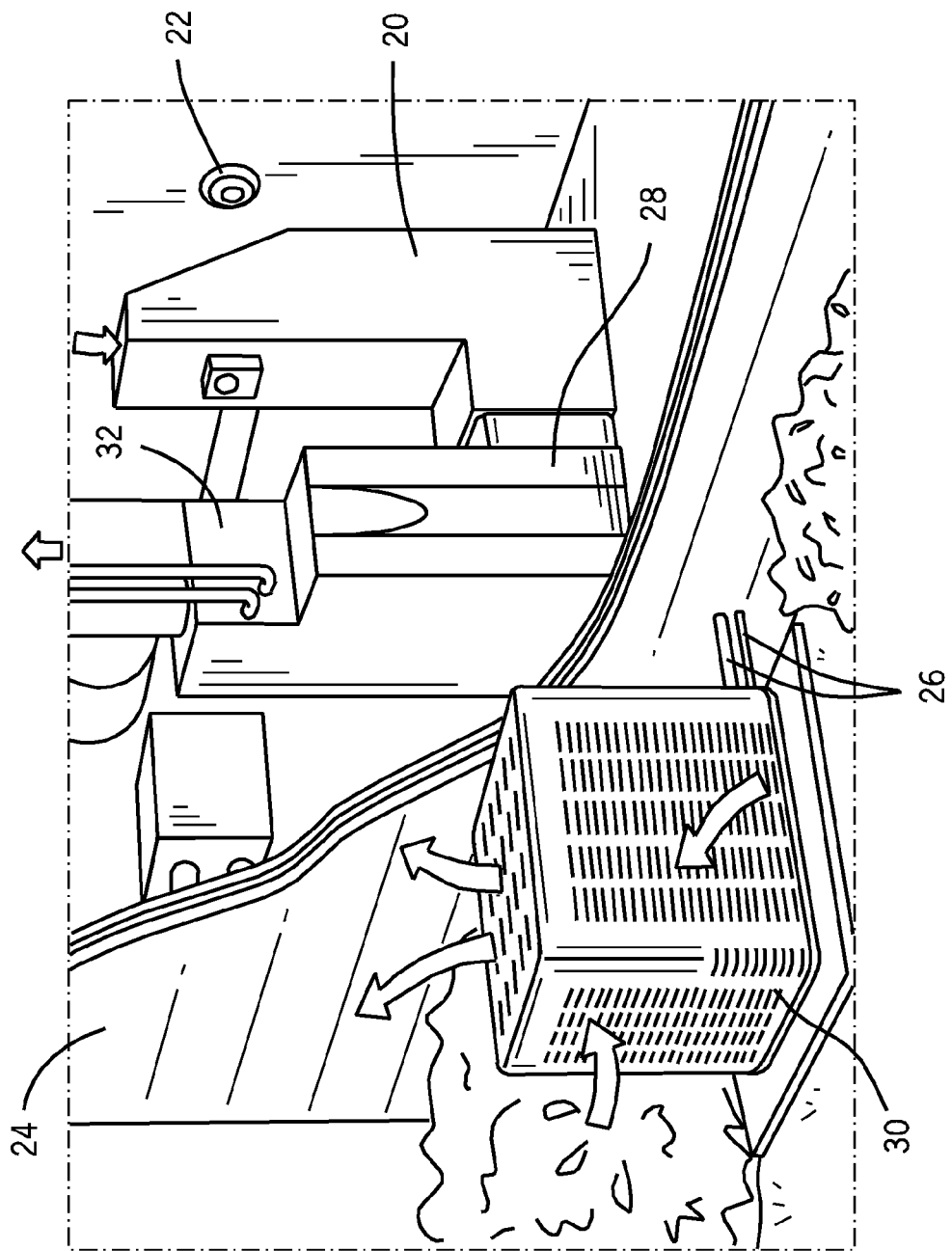
FIG. 2 is an illustration of an embodiment of a residential HVAC&R system that employs heat exchangers.

FIGS. 1 and 2 depict exemplary applications for heat exchangers that include multichannel tubes with flow path inlet sections. The multichannel tube with flow distribution inlet sections may be used in heat exchangers employed in a range of settings, both within the HVAC&R field and outside of that field. In presently contemplated applications, however, the heat exchangers may be used in residential, commercial, light industrial, industrial, and in any other application for heating or cooling a volume or enclosure, such as a residence, building, structure, and so forth. The multichannel tubes with flow path inlet sections may be particularly well suited for use in heat pump and/or evaporator heat exchangers with vertical manifolds. However, in other embodiments, the multichannel tubes may be used in other types of heat exchangers, such as condensers, or radiators, among others, as well as within heat exchangers with horizontal manifolds.

FIG. 1 illustrates an exemplary application; in this case an HVAC&R system for building environmental management that may employ heat exchangers. A building 10 is cooled by a system that includes a chiller 12 and a boiler 14. As shown, chiller 12 is disposed on the roof of building 10 and boiler 14 is located in the basement; however, the chiller and boiler may be located in other equipment rooms or areas next to the building. Chiller 12 is an air cooled or water cooled device that implements a refrigeration cycle to cool water. Chiller 12 may be a stand-alone unit or may be part of a single package unit containing other equipment, such as a blower and/or integrated air handler. Boiler 14 is a closed vessel that includes a furnace to heat water. The water from chiller 12 and boiler 14 is circulated through building 10 by water conduits 16. Water conduits 16 are routed to air handlers 18, located on individual floors and within sections of building 10.

Air handlers 18 are coupled to ductwork 20 that is adapted to distribute air between the air handlers. In certain embodiments, the ductwork may receive air from an outside intake (not shown). Air handlers 18 include heat exchangers that circulate cold water from chiller 12 and hot water from boiler 14 to provide heated or cooled air. Fans, within air handlers 18, draw air through the heat exchangers and direct the conditioned air to environments within building 10, such as rooms, apartments, or offices, to maintain the environments at a designated temperature. A control device 22, shown here as including a thermostat, may be used to designate the temperature of the conditioned air. Control device 22 also may be used to control the flow of air through and from air handlers 18. Other devices may, of course, be included in the system, such as control valves that regulate the flow of water and pressure and/or temperature transducers or switches that sense the temperatures and pressures of the water, the air, and so forth. Moreover, control devices may include computer systems that are integrated with or separate from other building control or monitoring systems, and even systems that are remote from the building.

FIG. 2 illustrates a residential heating and cooling system. In general, a residence 24 will include refrigerant conduits 26 that operatively couple an indoor unit 28 to an outdoor unit 30. Indoor unit 28 may be positioned in a utility room, an attic, a basement, and so forth. Outdoor unit 30 is typically situated adjacent to a side of residence 24 and is covered by a shroud to protect the system components and to prevent leaves and other contaminants from entering the unit. Refrigerant conduits 26 transfer refrigerant between indoor unit 28 and outdoor unit 30, typically transferring primarily liquid refrigerant in one direction and primarily vaporized refrigerant in an opposite direction.

When the system shown in FIG. 2 is operating as an air conditioner, a heat exchanger in outdoor unit 30 serves as a condenser for recondensing vaporized refrigerant flowing from indoor unit 28 to outdoor unit 30 via one of the refrigerant conduits 26. In these applications, a heat exchanger of the indoor unit, designated by the reference numeral 32, serves as an evaporator. Indoor unit 28 receives liquid refrigerant (which may be expanded by an expansion device, not shown) and evaporates the refrigerant before returning it to outdoor unit 30.

Outdoor unit 30 draws in environmental air through its sides as indicated by the arrows directed to the sides of the unit, forces the air through the outer unit heat exchanger by a means of a fan (not shown), and expels the air as indicated by the arrows above the outdoor unit. When operating as an air conditioner, the air is heated by the condenser heat exchanger within the outdoor unit and exits the top of the unit at a temperature higher than it entered the sides. Air is blown over indoor heat exchanger 32 and is then circulated through residence 24 by means of ductwork 20, as indicated by the arrows entering and exiting ductwork 20. The overall system operates to maintain a desired temperature as set by thermostat 22. When the temperature sensed inside the residence is higher than the set point on the thermostat (plus a small amount), the air conditioner will become operative to refrigerate additional air for circulation through the residence. When the temperature reaches the set point (minus a small amount), the unit will stop the refrigeration cycle temporarily.

When the unit in FIG. 2 operates as a heat pump, the roles of the heat exchangers are reversed. That is, the heat exchanger of outdoor unit 30 will serve as an evaporator to evaporate refrigerant and thereby cool air entering outdoor unit 30 as the air passes over the outdoor unit heat exchanger. Indoor heat exchanger 32 will receive a stream of air blown over it and will heat the air by condensing a refrigerant.

Figure 3:
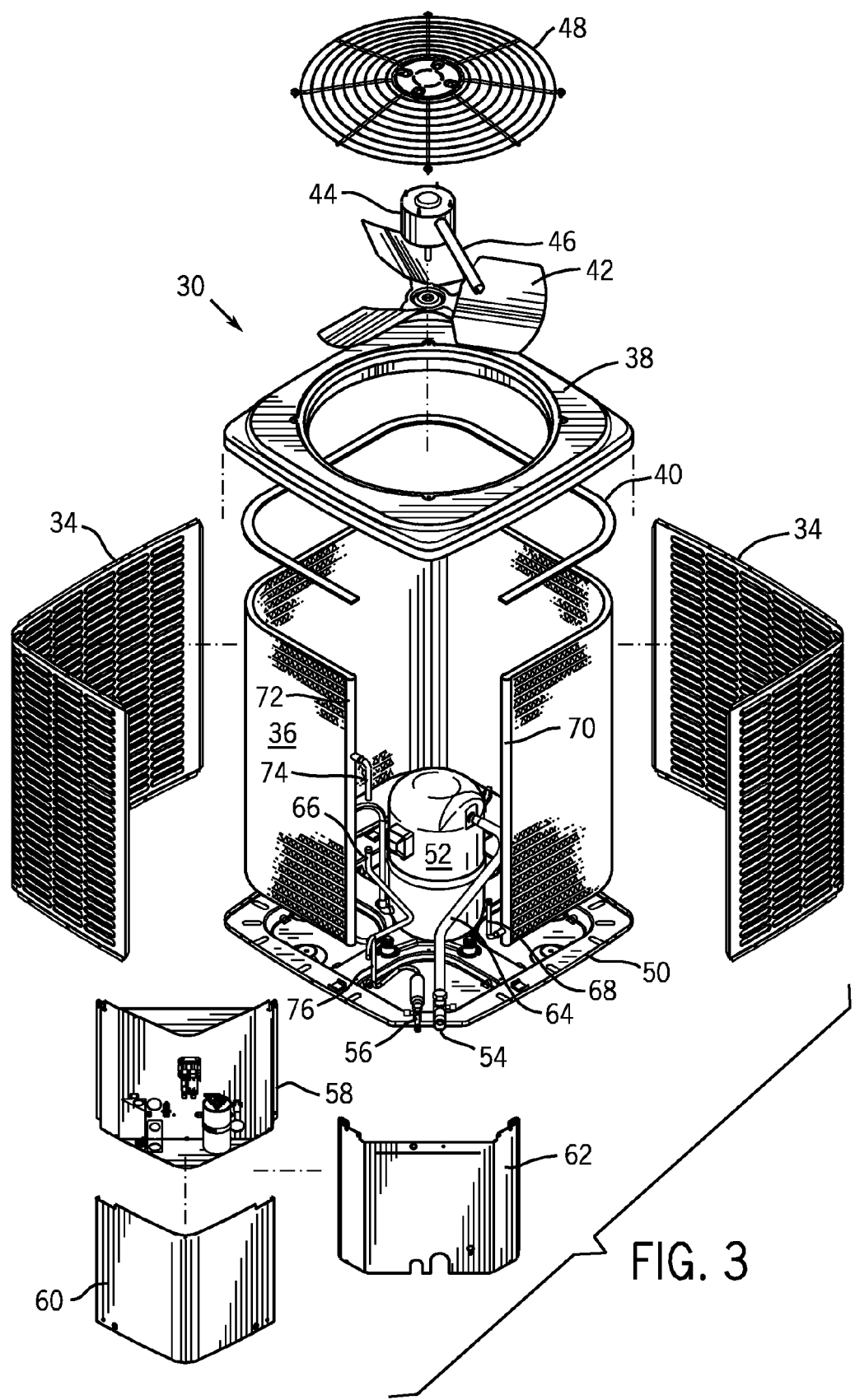
FIG. 3 is an exploded view of the outdoor unit shown in FIG. 2.

FIG. 3 illustrates a partially exploded view of one of the units shown in FIG. 2, in this case, outdoor unit 30. Unit 30 includes a shroud 34 that surrounds the sides of unit 30 to protect the system components. Adjacent to shroud 34 is a heat exchanger 36. A cover 38 encloses a top portion of heat exchanger 36. Foam 40 is disposed between cover 38 and heat exchanger 36. A fan 42 is located within an opening of cover 38 and is powered by a motor 44. A wire way 46 may be used to connect motor 44 to a power source. A fan guard 48 fits within cover 38 and is disposed above the fan to prevent objects from entering the fan.

Heat exchanger 36 is mounted on a base pan 50. Base pan 50 provides a mounting surface and structure for the internal components of unit 30. A compressor 52 is disposed within the center of unit 30 and is connected to another unit within the HVAC&R system, for example an indoor unit, by connections 54 and 56 that connect to conduits circulating refrigerant within the HVAC&R system. A control box 58 houses the control circuitry for outdoor unit 30 and is protected by a cover 60. A panel 62 may be used to mount control box 58 to unit 30.

Refrigerant enters unit 30 through vapor connection 54 and flows through a conduit 64 into compressor 52. The vapor may be received from the indoor unit (not shown). After undergoing compression in compressor 52, the refrigerant exits compressor 52 through a conduit 66 and enters heat exchanger 36 through inlet 68. Inlet 68 directs the refrigerant into a header or manifold 70. From manifold 70, the refrigerant flows through heat exchanger 36 to a header or manifold 72 where the refrigerant exits through an outlet 74 disposed on manifold 72. After exiting heat exchanger 36, the refrigerant flows through conduit 76 to liquid connection 56 to return to the indoor unit where the process may begin again.

Figure 4:
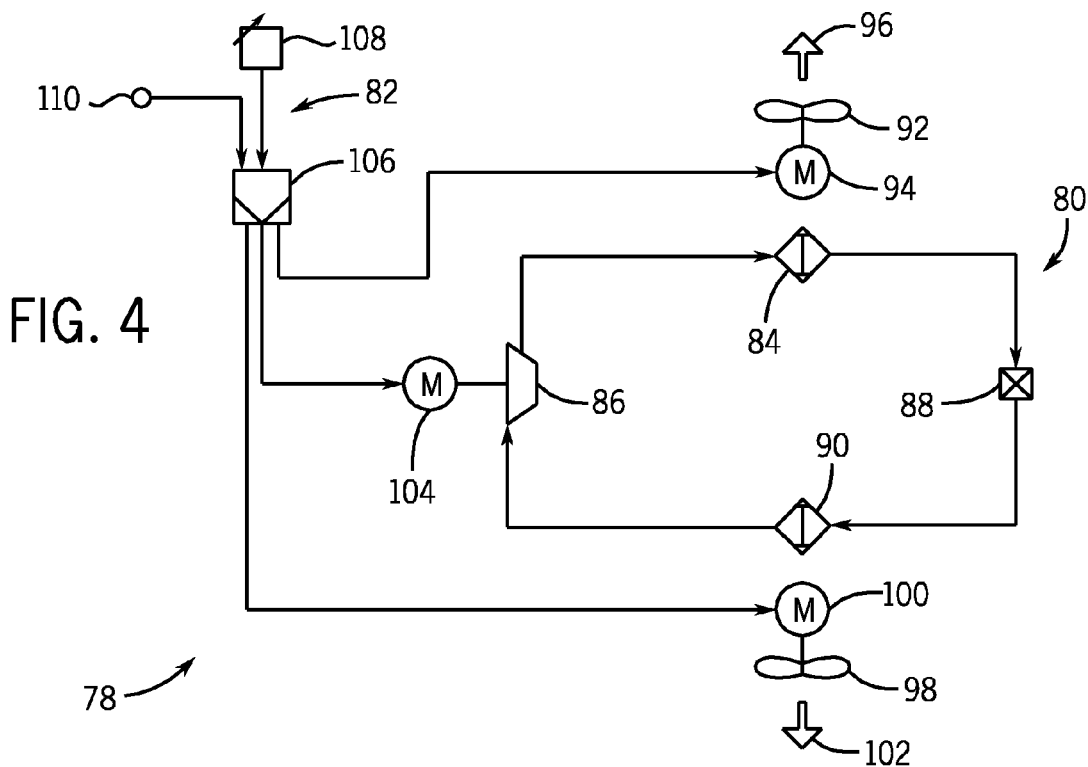
FIG. 4 is a diagrammatical overview of an embodiment of an air conditioning system that may employ one or more heat exchangers.

FIG. 4 illustrates an air conditioning system 78, which may employ plate fin heat exchangers. Refrigerant flows through system 78 within closed refrigeration loop 80. The refrigerant may be any fluid that absorbs and extracts heat. For example, the refrigerant may be hydrofluorocarbon (HFC) based R-410A, R-407, or R-134a, or it may be carbon dioxide (R-744A) or ammonia (R-717). Air conditioning system 78 includes control devices 82 that enable the system to cool an environment to a prescribed temperature.

System 78 cools an environment by cycling refrigerant within closed refrigeration loop 80 through a condenser 84, a compressor 86, an expansion device 88, and an evaporator 90. The refrigerant enters condenser 84 as a high pressure and temperature vapor and flows through the multichannel tubes of the condenser. A fan 92, which is driven by a motor 94, draws air across the multichannel tubes. The fan may push or pull air across the tubes. As the air flows across the tubes, heat transfers from the refrigerant vapor to the air, producing heated air 96 and causing the refrigerant vapor to condense into a liquid. The liquid refrigerant then flows into an expansion device 88 where the refrigerant expands to become a low pressure and temperature liquid. Typically, expansion device 88 will be a thermal expansion valve (TXV); however, according to other exemplary embodiments, the expansion device may be an orifice or a capillary tube. After the refrigerant exits the expansion device, some vapor refrigerant may be present in addition to the liquid refrigerant.

From expansion device 88, the refrigerant enters evaporator 90 and flows through the evaporator multichannel tubes. A fan 98, which is driven by a motor 100, draws air across the multichannel tubes. As the air flows across the tubes, heat transfers from the air to the refrigerant liquid, producing cooled air 102 and causing the refrigerant liquid to boil into a vapor. According to certain embodiments, the fan may be replaced by a pump that draws fluid across the multichannel tubes.

The refrigerant then flows to compressor 86 as a low pressure and temperature vapor. Compressor 86 reduces the volume available for the refrigerant vapor, consequently, increasing the pressure and temperature of the vapor refrigerant. The compressor may be any suitable compressor such as a screw compressor, reciprocating compressor, rotary compressor, swing link compressor, scroll compressor, or turbine compressor. Compressor 86 is driven by a motor 104 that receives power from a variable speed drive (VSD) or a direct AC or DC power source. According to an exemplary embodiment, motor 104 receives fixed line voltage and frequency from an AC power source although in certain applications the motor may be driven by a variable voltage or frequency drive. The motor may be a switched reluctance (SR) motor, an induction motor, an electronically commutated permanent magnet motor (ECM), or any other suitable motor type. The refrigerant exits compressor 86 as a high temperature and pressure vapor that is ready to enter the condenser and begin the refrigeration cycle again.

The control devices 82, which include control circuitry 106, an input device 108, and a temperature sensor 110, govern the operation of the refrigeration cycle. Control circuitry 106 is coupled to the motors 94, 100, and 104 that drive condenser fan 92, evaporator fan 98, and compressor 86, respectively. Control circuitry 106 uses information received from input device 108 and sensor 110 to determine when to operate the motors 94, 100, and 104 that drive the air conditioning system. In certain applications, the input device may be a conventional thermostat. However, the input device is not limited to thermostats, and more generally, any source of a fixed or changing set point may be employed. These may include local or remote command devices, computer systems and processors, and mechanical, electrical and electromechanical devices that manually or automatically set a temperature-related signal that the system receives. For example, in a residential air conditioning system, the input device may be a programmable 24-volt thermostat that provides a temperature set point to the control circuitry.

Sensor 110 determines the ambient air temperature and provides the temperature to control circuitry 106. Control circuitry 106 then compares the temperature received from the sensor to the temperature set point received from the input device. If the temperature is higher than the set point, control circuitry 106 may turn on motors 94, 100, and 104 to run air conditioning system 78. The control circuitry may execute hardware or software control algorithms to regulate the air conditioning system. According to exemplary embodiments, the control circuitry may include an analog to digital (A/D) converter, a microprocessor, a non-volatile memory, and an interface board. Other devices may, of course, be included in the system, such as additional pressure and/or temperature transducers or switches that sense temperatures and pressures of the refrigerant, the heat exchangers, the inlet and outlet air, and so forth.

Figure 5:
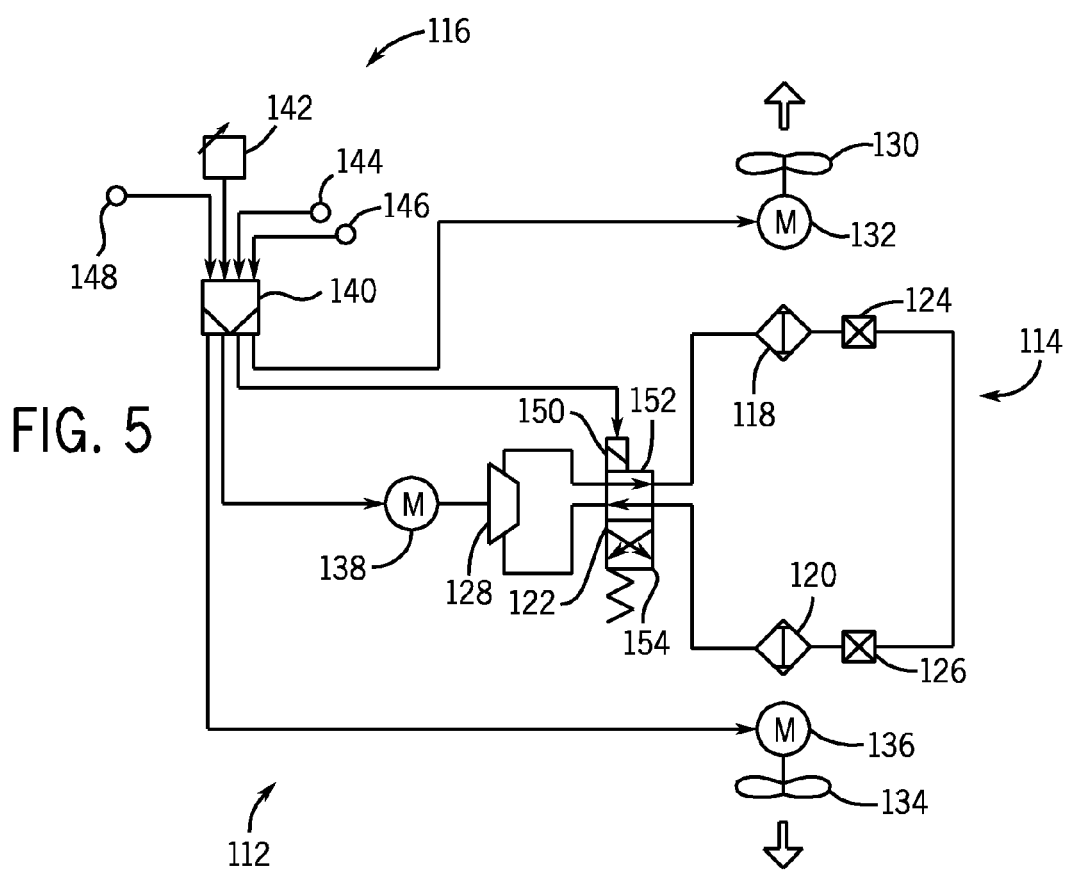
FIG. 5 is a diagrammatical over of an embodiment of a heat pump system that may employ one or more heat exchangers.

FIG. 5 illustrates a heat pump system 112 that may employ plate fin heat exchangers. Because the heat pump may be used for both heating and cooling, refrigerant flows through a reversible refrigeration/heating loop 114. The refrigerant may be any fluid that absorbs and extracts heat. The heating and cooling operations are regulated by control devices 116.

Heat pump system 112 includes an outside heat exchanger 118 and an inside heat exchanger 120 that both operate as heat exchangers. Each heat exchanger may function as an evaporator or a condenser depending on the heat pump operation mode. For example, when heat pump system 112 is operating in cooling (or "AC") mode, outside heat exchanger 118 functions as a condenser, releasing heat to the outside air, while inside heat exchanger 120 functions as an evaporator, absorbing heat from the inside air. When heat pump system 112 is operating in heating mode, outside heat exchanger 118 functions as an evaporator, absorbing heat from the outside air, while inside heat exchanger 120 functions as a condenser, releasing heat to the inside air. A reversing valve 122 is positioned on reversible loop 114 between the heat exchangers to control the direction of refrigerant flow and thereby to switch the heat pump between heating mode and cooling mode.

Heat pump system 112 also includes two metering devices 124 and 126 for decreasing the pressure and temperature of the refrigerant before it enters the evaporator. The metering devices also regulate the refrigerant flow entering the evaporator so that the amount of refrigerant entering the evaporator equals, or approximately equals, the amount of refrigerant exiting the evaporator. The metering device used depends on the heat pump operation mode. For example, when heat pump system 112 is operating in cooling mode, refrigerant bypasses metering device 124 and flows through metering device 126 before entering inside heat exchanger 120, which acts as an evaporator. In another example, when heat pump system 112 is operating in heating mode, refrigerant bypasses metering device 126 and flows through metering device 124 before entering outside heat exchanger 118, which acts as an evaporator. According to other exemplary embodiments, a single metering device may be used for both heating mode and cooling mode. The metering devices typically are thermal expansion valves (TXV), but also may be orifices or capillary tubes.

The refrigerant enters the evaporator, which is outside heat exchanger 118 in heating mode and inside heat exchanger 120 in cooling mode, as a low temperature and pressure liquid. Some vapor refrigerant also may be present as a result of the expansion process that occurs in metering device 124 or 126. The refrigerant flows through multichannel tubes in the evaporator and absorbs heat from the air changing the refrigerant into a vapor. In cooling mode, the indoor air flowing across the multichannel tubes also may be dehumidified. The moisture from the air may condense on the outer surface of the multichannel tubes and consequently be removed from the air.

After exiting the evaporator, the refrigerant passes through reversing valve 122 and into a compressor 128. Compressor 128 decreases the volume of the refrigerant vapor, thereby, increasing the temperature and pressure of the vapor. The compressor may be any suitable compressor such as a screw compressor, reciprocating compressor, rotary compressor, swing link compressor, scroll compressor, or turbine compressor.

From compressor 128, the increased temperature and pressure vapor refrigerant flows into a condenser, the location of which is determined by the heat pump mode. In cooling mode, the refrigerant flows into outside heat exchanger 118 (acting as a condenser). A fan 130, which is powered by a motor 132, draws air across the multichannel tubes containing refrigerant vapor. According to certain exemplary embodiments, the fan may be replaced by a pump that draws fluid across the multichannel tubes. The heat from the refrigerant is transferred to the outside air causing the refrigerant to condense into a liquid. In heating mode, the refrigerant flows into inside heat exchanger 120 (acting as a condenser). A fan 134, which is powered by a motor 136, draws air across the multichannel tubes containing refrigerant vapor. The heat from the refrigerant is transferred to the inside air causing the refrigerant to condense into a liquid.

After exiting the condenser, the refrigerant flows through the metering device (124 in heating mode and 126 in cooling mode) and returns to the evaporator (outside heat exchanger 118 in heating mode and inside heat exchanger 120 in cooling mode) where the process begins again.

In both heating and cooling modes, a motor 138 drives compressor 128 and circulates refrigerant through reversible refrigeration/heating loop 114. The motor may receive power either directly from an AC or DC power source or from a variable speed drive (VSD). The motor may be a switched reluctance (SR) motor, an induction motor, an electronically commutated permanent magnet motor (ECM), or any other suitable motor type.

The operation of motor 138 is controlled by control circuitry 140. Control circuitry 140 receives information from an input device 142 and sensors 144, 146, and 148 and uses the information to control the operation of heat pump system 112 in both cooling mode and heating mode. For example, in cooling mode, input device 142 provides a temperature set point to control circuitry 140. Sensor 148 measures the ambient indoor air temperature and provides it to control circuitry 140. Control circuitry 140 then compares the air temperature to the temperature set point and engages compressor motor 138 and fan motors 132 and 136 to run the cooling system if the air temperature is above the temperature set point. In heating mode, control circuitry 140 compares the air temperature from sensor 148 to the temperature set point from input device 142 and engages motors 132, 136, and 138 to run the heating system if the air temperature is below the temperature set point.

Control circuitry 140 also uses information received from input device 142 to switch heat pump system 112 between heating mode and cooling mode. For example, if input device 142 is set to cooling mode, control circuitry 140 will send a signal to a solenoid 150 to place reversing valve 122 in an air conditioning position 152. Consequently, the refrigerant will flow through reversible loop 114 as follows: the refrigerant exits compressor 128, is condensed in outside heat exchanger 118, is expanded by metering device 126, and is evaporated by inside heat exchanger 120. If the input device is set to heating mode, control circuitry 140 will send a signal to solenoid 150 to place reversing valve 122 in a heat pump position 154. Consequently, the refrigerant will flow through the reversible loop 114 as follows: the refrigerant exits compressor 128, is condensed in inside heat exchanger 120, is expanded by metering device 124, and is evaporated by outside heat exchanger 118.

The control circuitry may execute hardware or software control algorithms to regulate heat pump system 112. According to exemplary embodiments, the control circuitry may include an analog to digital (A/D) converter, a microprocessor, a non-volatile memory, and an interface board.

The control circuitry also may initiate a defrost cycle when the system is operating in heating mode. When the outdoor temperature approaches freezing, moisture in the outside air that is directed over outside heat exchanger 118 may condense and freeze on the heat exchanger. Sensor 144 measures the outside air temperature, and sensor 146 measures the temperature of outside heat exchanger 118. These sensors provide the temperature information to the control circuitry which determines when to initiate a defrost cycle. For example, if either sensor 144 or 146 provides a temperature below freezing to the control circuitry, system 112 may be placed in defrost mode. In defrost mode, solenoid 150 is actuated to place reversing valve 122 in air conditioning position 152, and motor 132 is shut off to discontinue airflow over the multichannel tubes. System 112 then operates in cooling mode until the increased temperature and pressure refrigerant flowing through outside heat exchanger 80 defrosts the heat exchanger. Once sensor 146 detects that heat exchanger 118 is defrosted, control circuitry 140 returns the reversing valve 122 to heat pump position 154. As will be appreciated by those skilled in the art, the defrost cycle can be set to occur at many different time and temperature combinations.

Figure 6:
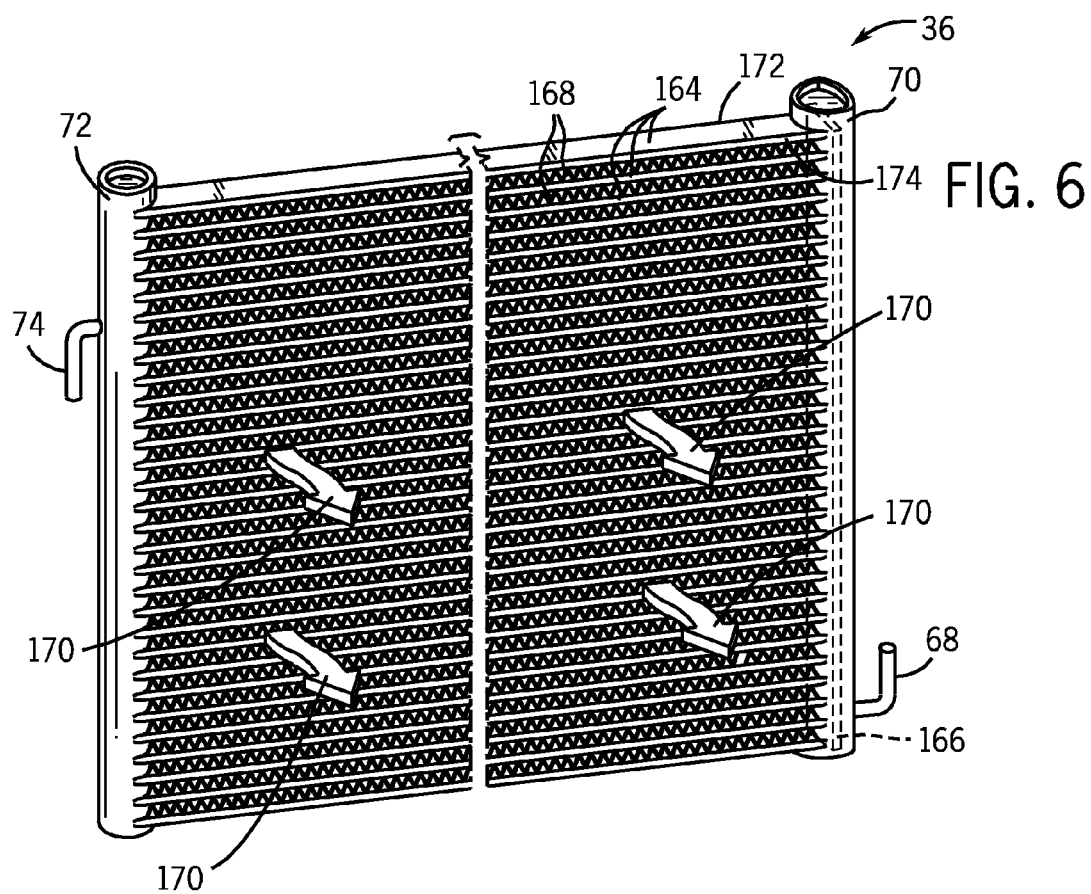
FIG. 6 is a perspective view of an embodiment of a heat exchanger containing multichannel tubes with flow path inlet sections.

FIG. 6 is a perspective view of a heat exchanger that may be used in air conditioning system 78, shown in FIG. 4, or heat pump system 112, shown in FIG. 5. The exemplary heat exchanger may be a condenser 84, an evaporator 90, an outside heat exchanger 118, or an inside heat exchanger 120, as shown in FIGS. 4 and 5. It should be noted that in similar or other systems, the heat exchanger might be used as part of a chiller or in any other heat exchanging application. The heat exchanger includes manifolds 70 and 72 that are connected by multichannel tubes 164. Although 30 tubes are shown in FIG. 6, the number of tubes may vary. The manifolds and tubes may be constructed of aluminum or any other material that promotes good heat transfer.

Refrigerant flows from manifold 70 through multichannel tubes 164 to manifold 72. Although the multichannel tubes are depicted as having an elongated and oblong shape, the tubes may be any shape, such as tubes with a cross-section in the form of a rectangle, square, circle, oval, ellipse, triangle, trapezoid, or parallelogram. According to exemplary embodiments, the tubes may have a height ranging from approximately 0.5 mm to 3 mm and a width ranging from approximately 10 mm to 45 mm However, in other embodiments, the tube dimensions may vary. It should also be noted that the heat exchanger may be provided in a single plane or slab, or may include bends, corners, contours, and so forth. Moreover, although a single pass heat exchanger is depicted, the multichannel tubes described herein may be employed in multi-pass heat exchangers. Further, the number of tubes and/or the length of the tubes within the heat exchanger may vary depending on a variety of factors, such as desired cooling capacity, environmental temperatures, and space available, among others.

Refrigerant enters the heat exchanger through inlet 68 and flows into inlet manifold 70. A distribution plate 166 divides inlet manifold 70 along its length and facilitates distribution of the refrigerant into multichannel tubes 164. As shown, distribution plate 166 extends along the entire length of manifold 70. However, in other embodiments, distribution plate 166 may extend along only a portion of the length of manifold 70. As described further below, distribution plate 166 may include orifices that direct the refrigerant into individual multichannel tubes 164. The refrigerant then flows through multichannel tubes 164 and into outlet manifold 72, where the refrigerant exits the heat exchanger through outlet 74. Although FIG. 6 depicts the inlet on the bottom of manifold 70 and the outlet on the upper half of manifold 72, the inlet and outlet may be disposed on other locations on manifolds 70 and 72. The fluid also may enter and exit the manifolds from multiple inlets and outlets positioned on bottom, side, or top surfaces of the manifolds. Moreover, in multi-pass configurations, the inlet and outlet may be disposed on the same manifold, with baffles separating the inlet and outlet portions of the manifold.

Fins 168 are located between multichannel tubes 164 to promote the transfer of heat between the tubes and the environment. According to an exemplary embodiment, the fins are constructed of aluminum, brazed or otherwise joined to the tubes, and disposed generally perpendicular to the flow of refrigerant. However, according to other exemplary embodiments, the fins may be made of other materials that facilitate heat transfer and may extend parallel or at varying angles with respect to the flow of the refrigerant. Although shown in FIG. 6 as corrugated fins, in other embodiments, the fins may be plate fins, or any other suitable type of fin. The fins may include surface features and formations such as louvers, raised lances, corrugations, ribs, and combinations thereof.

When an external fluid, such as air, flows across multichannel tubes 164, as generally indicated by arrows 170, heat transfer occurs between the refrigerant flowing within multichannel tubes 164 and the external fluid. Although the external fluid is shown here as air, other fluids may be used. The external fluid first contacts multichannel tubes 164 at a leading edge 172, then flows across the width of the tubes, and lastly contacts a trailing edge 174 of the tubes. As the external fluid flows across the tubes, heat is transferred to and from the tubes to the external fluid. For example, in a condenser, the external fluid is generally cooler than the fluid flowing within the multichannel tubes. As the external fluid contacts the leading edge of a multichannel tube, heat is transferred from the refrigerant within the multichannel tube to the external fluid. Consequently, the external fluid is heated as it passes over the multichannel tubes and the refrigerant flowing within the multichannel tubes is cooled. In an evaporator, the external fluid generally has a temperature higher than the refrigerant flowing within the multichannel tubes. Consequently, as the external fluid contacts the leading edge of the multichannel tubes, heat is transferred from the external fluid to the refrigerant flowing in the tubes to heat the refrigerant. The external fluid leaving the multichannel tubes is then cooled because the heat has been transferred to the refrigerant.

Figure 7:
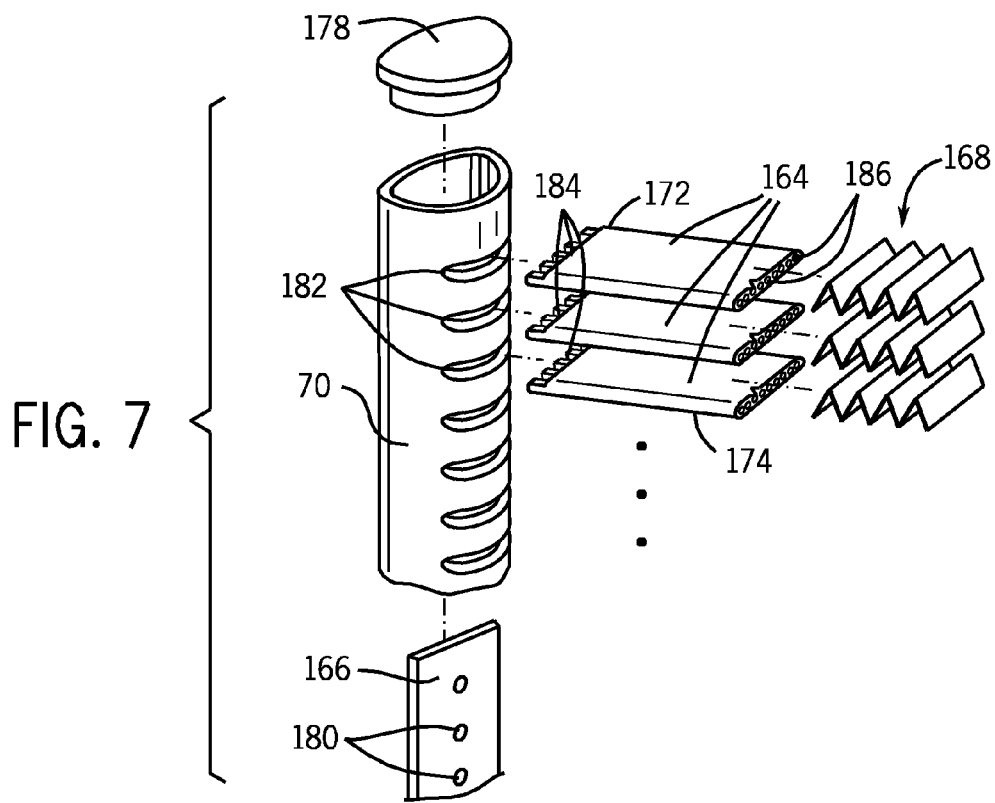
FIG. 7 is a partially exploded view of a portion of the heat exchanger of FIG. 6.

FIG. 7 illustrates components of the heat exchanger of FIG. 6 in a somewhat more detailed and exploded view. Manifold 70 is a tubular structure with open ends that are each enclosed by a cap 178. Although not shown in FIG. 7, manifold 72 is a similar tubular structure with a pair of open ends that are also enclosed by caps 178. As shown in FIG. 6, manifold 70 has an oblong shape and manifold 72 has a circular shape. However, in other embodiments, manifolds 70 and 72 may both have an oblong shape, a circular shape, or another cross-sectional shape. Distribution plate 166 is inserted within inlet manifold 70 to divide inlet manifold 70 into an inlet section and a distribution section, as discussed further below with respect to FIG. 8. Distribution plate 166 includes orifices 180 that allow fluid to flow from the inlet section of the manifold to the distribution section where the fluid enters multichannel tubes 164.

Openings, or apertures, 182 are formed in the manifolds, such as by conventional piercing or machining operations. Multichannel tubes 164 may then be inserted into openings 182 in a generally parallel fashion. Ends 184 of the tubes are inserted into openings 180 so that ends 184 abut against distribution plate 166. Ends 184 include a distribution section where a portion of the outer tube wall has been removed to allow fluid to enter the flow paths 186 of multichannel tube 164. For example, fluid may enter inlet manifold 70, flow through orifices 180 in distribution plate 166, and then may enter multichannel tubes 164 through the distribution sections included within ends 184. After the fluid has entered multichannel tubes 164, the fluid may flow through flow paths 186 within the tubes to outlet manifold 72.

Figure 8:
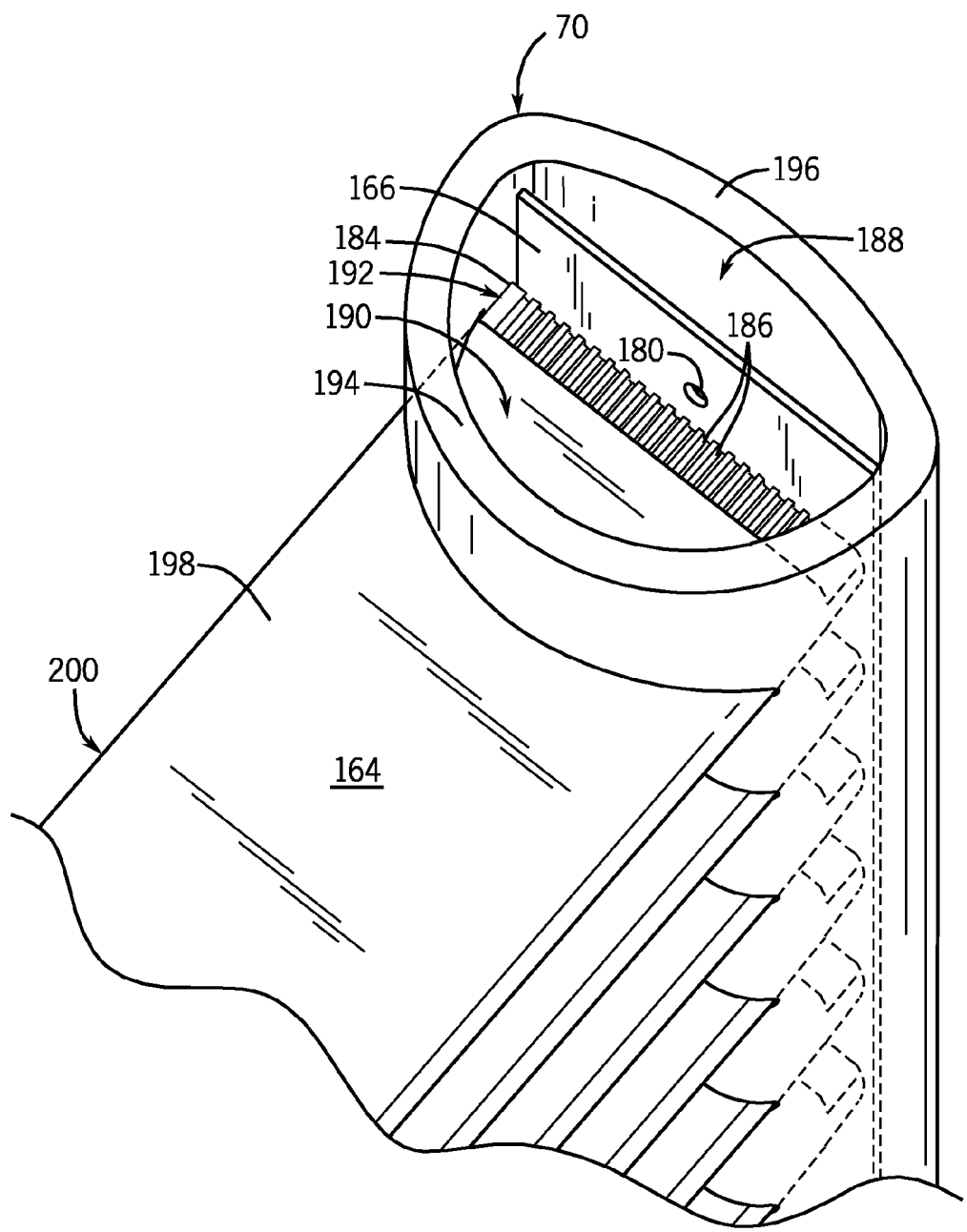
FIG. 8 is a top perspective view of a portion of the heat exchanger of FIG. 6.

FIG. 8 is a top perspective view of the inlet manifold 70 of FIG. 6 with the top cap 178 (FIG. 7) removed to show the interior of manifold 70. Distribution plate 166 divides inlet manifold 70 into an inlet section 188 and a distribution section 190. In particular, distribution plate 166 extends across an entire internal width of manifold to divide manifold 70 into the independent and separate sections 188 and 190. Distribution plate 166 also extends between end caps 178 (FIG. 6) along the entire length of manifold 70. In other embodiments, distribution plate 166 may extend along a portion of the length of manifold 70. For example, in a multi-pass heat exchanger, the distribution plate may extend between one of the end caps 178 and a baffle. In another example, the distribution plate may extend along the length of manifold 70 from one of the end caps 178 to just below inlet 66. In a further example, the distribution plate may extend along the length of manifold 70 in front of only some of the multichannel tubes. According to certain embodiments, distribution plate 166 may be brazed, interference fit, or otherwise disposed within manifold 70 to divide the interior of manifold 70 into inlet section 188 and distribution section 190. Further, in certain embodiments, distribution plate 166 may be integrally formed as part of manifold 70. Although distribution plate 166 is shown as a generally flat plate, in other embodiments, the shape and/or geometry of distribution plate 166 may vary. For example, in other embodiments, distribution plate 166 may be curved and/or tubular.

Refrigerant enters inlet manifold 70 through inlet 68 (FIG. 6) and flows through manifold 70 within inlet section 188. Distribution section 190 may then distribute the refrigerant from inlet section 188 to a flow path inlet section 192 of multichannel tubes 164. In particular, orifices 180 within distribution plate 166 may meter the flow of refrigerant from inlet section 188 to distribution section 190. According to certain embodiments, orifices 180 may be designed to meter the flow of refrigerant to each of the multichannel tubes. As described further below with respect to FIG. 9, distribution plate 166 may include many orifices designed to direct the flow of refrigerant to the multichannel tubes 164.

Figure 9:
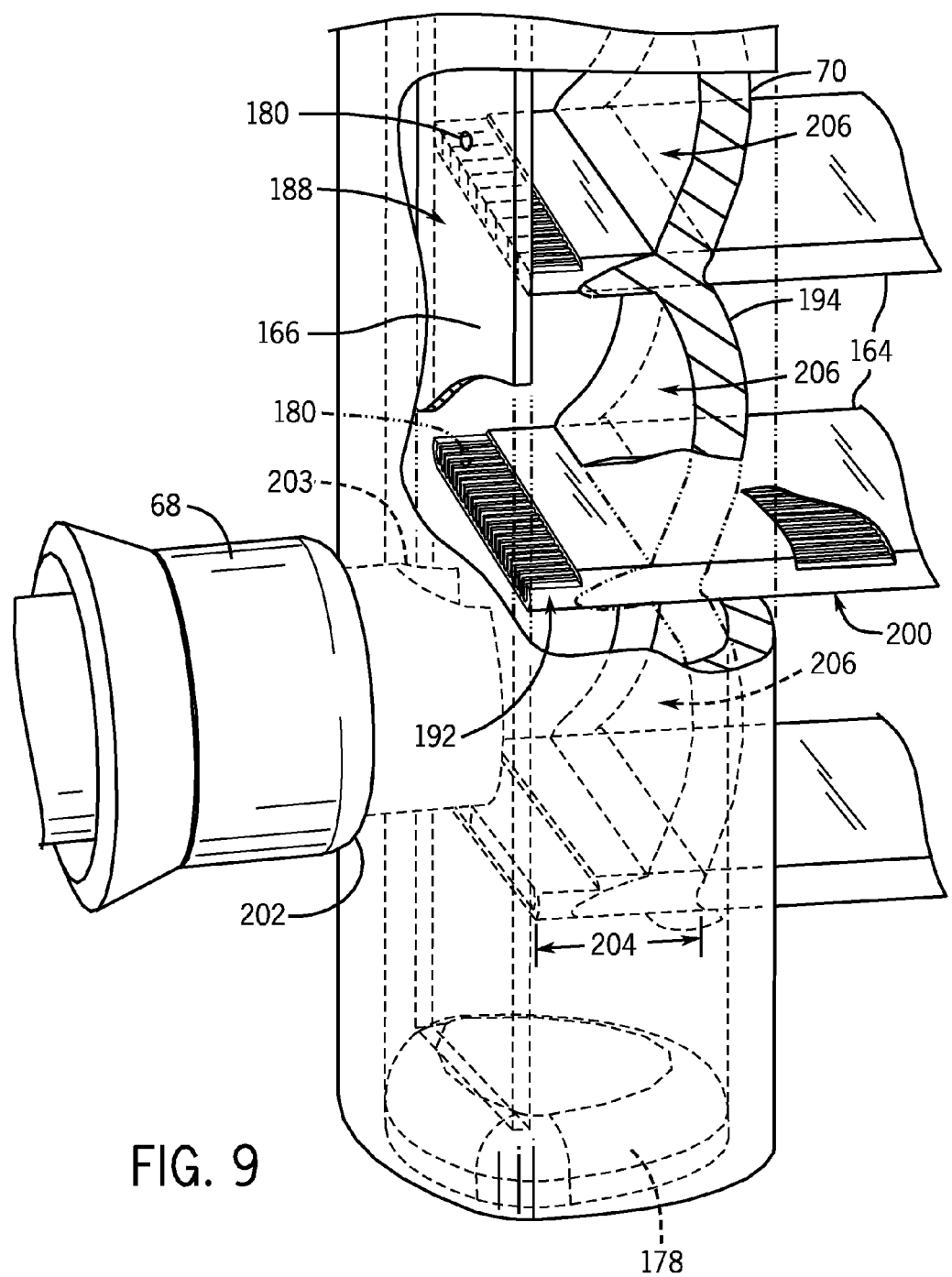
FIG. 9 is a side perspective view of a portion of the heat exchanger of FIG. 6.

As shown in FIG. 8, inlet manifold 70 has an oblong cross-sectional shape designed to promote mixed phase flow of refrigerant within inlet section 188. In other embodiments, inlet manifold 70 may have another cross-sectional shape, such as round or rectangular, among others. Inlet manifold 70 is a tubular structure with a tube-receiving portion 194 and an inlet-receiving portion 196. As shown above in FIG. 7, tube-receiving portion 194 include apertures 182 for receiving the ends of multichannel tubes 164. As shown in FIG. 9, inlet-receiving portion 196 includes an opening for receiving inlet 68, which directs refrigerant into the heat exchanger. According to certain embodiments, manifold 70 may be extruded as a single piece that includes both tube-receiving portion 194 and inlet-receiving portion 196.

Inlet section 188 is generally defined by distribution plate 166 and inlet-receiving portion 196. Inlet-receiving portion 196 has a relatively shallow curve that produces a relatively small cross-sectional area for inlet section 188. According to certain embodiments, the small cross-sectional area of inlet section 188 may be designed to promote mixed phase flow of refrigerant through inlet section 188. In particular, a mixed phase flow of liquid and vapor refrigerant may enter inlet section 188. The small cross-sectional area may promote turbulent mixing of the liquid and vapor, thereby distributing the liquid and the vapor relatively evenly throughout inlet section 188. In certain embodiments, inserts, such as interior baffles, plates, or the like, may be included within inlet section 188 to further reduce the cross-sectional area.

As the refrigerant flows through inlet section 188, the refrigerant is distributed to distribution section 190 through orifices 180 included within distribution plate 166. As described further with respect to FIG. 9, multiple orifices 180 may be included along the length of distribution plate 166. Distribution section 190 is generally defined by distribution plate 166 and tube-receiving portion 194 of manifold 70. Tube-receiving portion 194 has a relatively steep curve as compared to inlet-receiving portion 196, which produces a relatively large cross-sectional area for distribution section 190.

Tube-receiving portion 194 also includes the apertures 182 for receiving multichannel tubes 164. Multichannel tubes 164 extend through apertures 182 into distribution section 190 where the ends 184 of multichannel tubes 164 abut against distribution plate 166 to inhibit the flow of refrigerant into multichannel tubes 164 through ends 184. Accordingly, instead of entering through ends 184, the refrigerant enters the multichannel tubes 164 through flow path inlet sections 192 of the multichannel tubes. The flow path inlet sections 192 include sections of the multichannel tubes where a portion of the outer wall 198 of each multichannel tube 164 has been removed to expose a portion of flow paths 186 to distribution section 190. As shown, multichannel tubes 164 have a generally oblong cross-section; however, in other embodiments, the multichannel tubes may have another cross-sectional shape, such as round or rectangular, among others.

Refrigerant enters multichannel tubes 164 through the exposed flow paths 186 within flow path inlet sections 192 and then continues flowing through flows paths 186 within a fluid flow section 200 to the opposite end of multichannel tube 164. Within fluid flow section 200, the flow paths 186 are completely enclosed by outer wall 198, which extends around the entire cross-section of multichannel tubes 164.

FIG. 9 is a side perspective view of the heat exchanger of FIG. 6 with a portion of manifold 70 cut away to show the interior of manifold 70. Inlet 68 extends through an opening 202 of manifold 70 to direct refrigerant into inlet section 188 through an inlet port 203. As shown, inlet 68 abuts against distribution plate 166 so that inlet port 203 may direct the refrigerant upwards from inlet 68. However, in other embodiments, inlet port 203 may be designed to direct refrigerant to the sides or straight at distribution plate 166. In these embodiments, inlet 68 may be spaced from distribution plate 166 rather than abutting against distribution plate 166. In certain embodiment, directing the refrigerant against distribution plate 166 may promote mixing of the liquid and vapor phase refrigerant.

As shown in FIG. 9, distribution plate 166 extends to the cap 178 that encloses the bottom of manifold 70. Although not shown, distribution plate 166 also extends to the cap 178 at the top of manifold 70. Accordingly, distribution plate 166 extends along the entire length of manifold 70 to divide manifold 70 into inlet section 188 and distribution section 190. In other embodiments, distribution plate 166 may extend along only a portion of the length of manifold 70 to divide manifold 70 into inlet section 188 and distribution section 190.

Multichannel tubes 164 extend into distribution section 190 at an insertion depth 204 that allows ends 184 of tubes 164 to abut against distribution plate 166. Accordingly, the tubes 164 partition distribution section 190 into a series of distribution chambers 206, with each chamber generally defined by a pair of adjacent tubes 164, distribution plate 166, and tube-receiving portion 194 of manifold 70. As shown, each distribution chamber 206 is bounded by a pair of adjacent tubes 164. However, in other embodiments, some or all of the distribution chambers 206 may include additional intermediate tubes 164 that extend in the distribution chamber 206 between the top and bottom tubes 164 that abut distribution plate 166 to define the distribution chamber 206. In these embodiments, the intermediate tubes may not abut the distribution plate 166, allowing refrigerant to enter the intermediate tubes through ends 184 of these tubes and/or through flow path inlet sections 192 of these tubes 164.

In certain embodiments, distribution chambers 206 may only be partially enclosed, thereby allowing some refrigerant flow between distribution chambers 206. For example, in certain embodiments, gaps may exist between the sides of tubes 164 and tube-receiving portion 194 of manifold 70. However, in other embodiments, distribution chambers 206 may be completely, or almost completely enclosed, by the pair of tubes 164, distribution plate 166, and tube-receiving portion 194 of manifold 70, thereby preventing or inhibiting the flow of refrigerant between distribution chambers 206. For example, in certain embodiments, the tube-receiving portion 194 of manifold 70 may be designed to abut against the sides of tubes 164. In these embodiments, minimal refrigerant may flow along the sides of tubes 164. Further, in certain embodiments, the tube-receiving portion 194 may be sealed to the sides of tubes 164, for example, by brazing, to inhibit the flow of refrigerant between distribution chambers 206. In another embodiment, distribution plate 166 may include extensions that connect the sides of tubes 164 to tube-receiving portion 194 of manifold 70.

The mixed phase refrigerant enters each distribution chamber 206 through an orifice 180 of distribution plate 166 that is aligned with each respective distribution chamber 206. Orifices 180 may be relatively small openings designed to meter the flow of refrigerant into each chamber 206. As shown, orifices 180 are circular in cross-section; however, in other embodiments, the orifices may have another cross-sectional shape. For example, the orifices may be triangular, elliptical, rectangular, square, trapezoidal, or combinations thereof, among others. According to certain embodiments, orifices 180 may be punched or stamped into distribution plate 166. Further, in certain embodiments, orifices 180 may include slits, or other type openings formed within distribution plate 166. According to certain embodiments, orifices 180 may function as expansion devices. Moreover, in certain embodiments, orifices 180 may be angled to direct the flow of refrigerant towards certain sections of distribution chambers 206.

According to certain embodiments, one orifice 180 may be aligned with each distribution chamber 206. However, in other embodiments, multiple orifices may be aligned with one or more of the distribution chambers 206. In certain embodiments, the number, shape, and/or location of the orifices 180 for each distribution chamber 206 may be designed to provide a certain amount of refrigerant to each distribution chamber 206. For example, distribution chambers 206 aligned with multichannel tubes 164 that receive less airflow (i.e. tubes near the top or bottom of the heat exchanger or located close to external walls or equipment) may be aligned with fewer orifices 180 to direct less refrigerant into these chambers 206. In another example, distribution chambers 206 located in portions of manifold 70 that receive relatively less refrigerant, (i.e. due to refrigerant velocity, manifold shape, etc.) may have more orifices 180 to promote the flow of refrigerant into these distribution chambers 206. Further, in certain embodiments, distribution chambers 206 which are not completely enclosed may not be aligned with any orifices 180, and these distribution chambers 206 may receive refrigerant from adjacent distribution chambers 206.

After the refrigerant enters distribution chambers 206, the refrigerant may enter the multichannel tubes 164 that extend into distribution chambers 206 through the flow path inlet sections 192 of the multichannel tube 164. The refrigerant may then flow through the flow paths 186 within the fluid flow section 200 of each multichannel tube 164.

Figure 10:
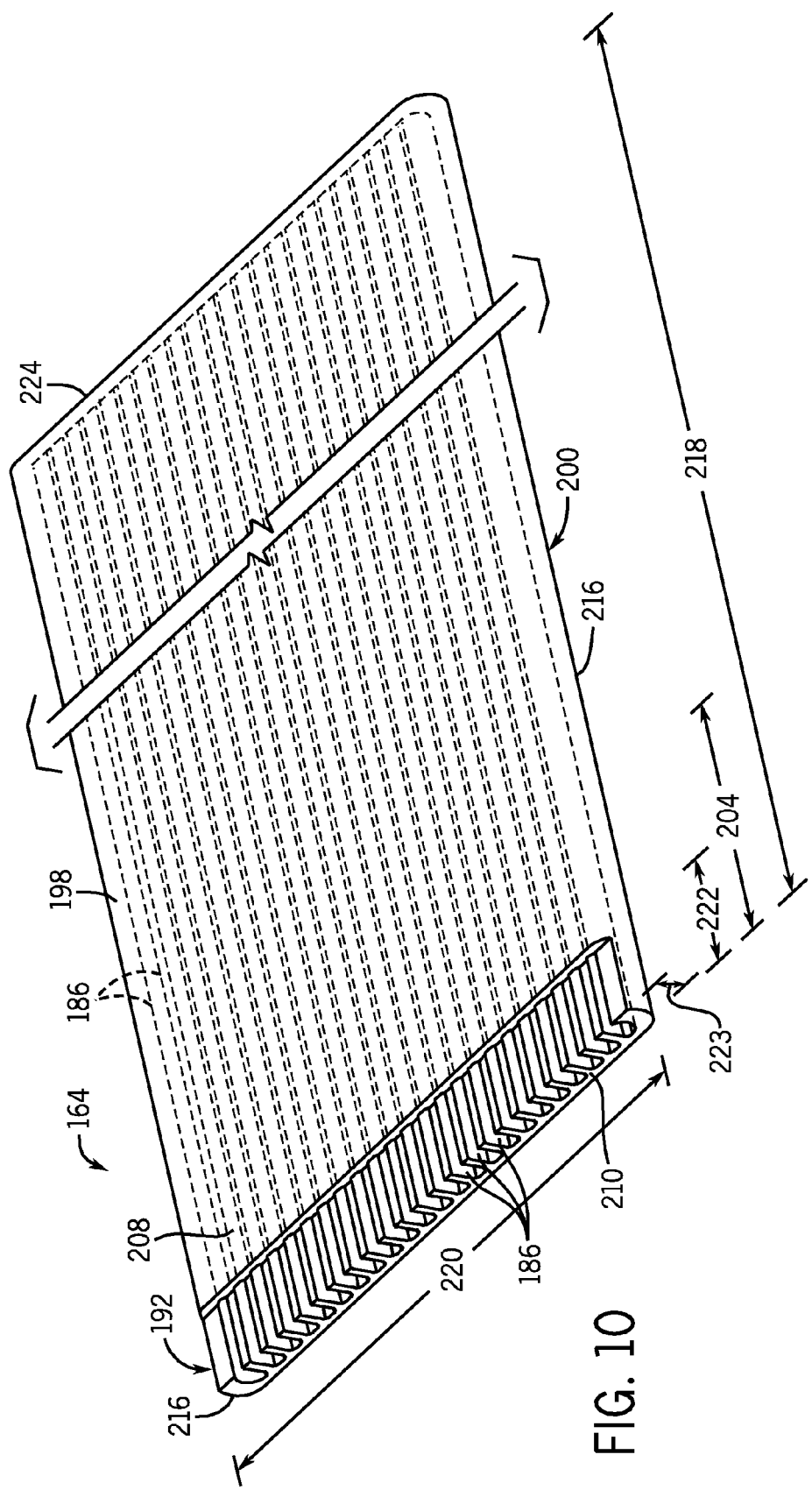
FIG. 10 is a perspective view of a multichannel tube employed in the heat exchanger of FIG. 6.

FIG. 10 is a perspective view of one of the multichannel tubes 164. Outer wall 198 extends between ends 184 and 224 of multichannel tube 164 and generally encircles the cross section of multichannel tube 164. As shown, multichannel tube 164 has an oblong cross section and outer wall 198 includes a top wall 208, a bottom wall 210, and a pair of side walls 216 that connect top wall 208 and bottom wall 210. However, in other embodiments, multichannel tube 164 may have a circular or rectangular cross section.

Flow paths 186 extend between ends 184 and 224 of multichannel tube 164 and are enclosed by top wall 208, bottom wall 210, and side walls 216. According to certain embodiments, flow paths 186 may be formed during extrusion of the multichannel tube. Flow paths 186 may extend generally parallel to one another along the entire length 218 of tube 164. Flow paths 186 also may generally be evenly spaced across the width 220 of tube 164. Within fluid flow section 200, flow paths 186 are completely enclosed by top wall 208, bottom wall 210, and side walls 216. However, in flow path inlet section 192, the top wall 208 has been removed to expose a portion of the flow paths 186. According to certain embodiments, the top wall 208 may be removed by shaving or cutting the top wall 208 to remove the desired portion. However, in other embodiments, the top wall 208 may be pierced or holes may be machined in top wall 208 to form openings in the portion of the top wall 208 within flow path inlet section 192.

As discussed above with respect to FIG. 9, flow path inlet section 192 allows refrigerant to enter multichannel tube 164 from a distribution chamber 206.

As shown, inlet section 192 extends completely across the width 220 of multichannel tube 164 and has a length 222. According to certain embodiments, length 222 may be approximately 0.5 to 5 times the height 223 of the flow paths 186, and all subranges therebetween. However, in other embodiments, length 222 may vary. Further, length 222 may be approximately equal to or less than the insertion depth 204 of multichannel tube 164 within distribution section 190. Further, in certain embodiments, inlet section 192 may extend only part way across the width 220.

As described above with respect to FIG. 9, refrigerant may enter flow paths 186 through inlet section 192 and then may continue flowing through flow paths 186 along the length 218 of tube 164. Refrigerant may then exit tube 164 though the opposite end 244 of multichannel tube 164. As shown, top wall 208 extends to opposite end 224 and flow paths 186 are completely enclosed by top wall 208, bottom wall 210, and side walls 216 at opposite end 224. However, in other embodiments, opposite end 224 also may include an inlet section that is similar to inlet section 192. In these embodiments, the top wall 208 also may be removed adjacent to opposite end 224 to expose a portion of the flow paths 186 near opposite end 224. According to certain embodiments, the inclusion of a inlet section 192 at each end 184 and 224 may facilitate assembly of the heat exchanger by allowing either end 184 or 224 of multichannel tube 164 to be inserted within inlet manifold 70.

Figure 11:
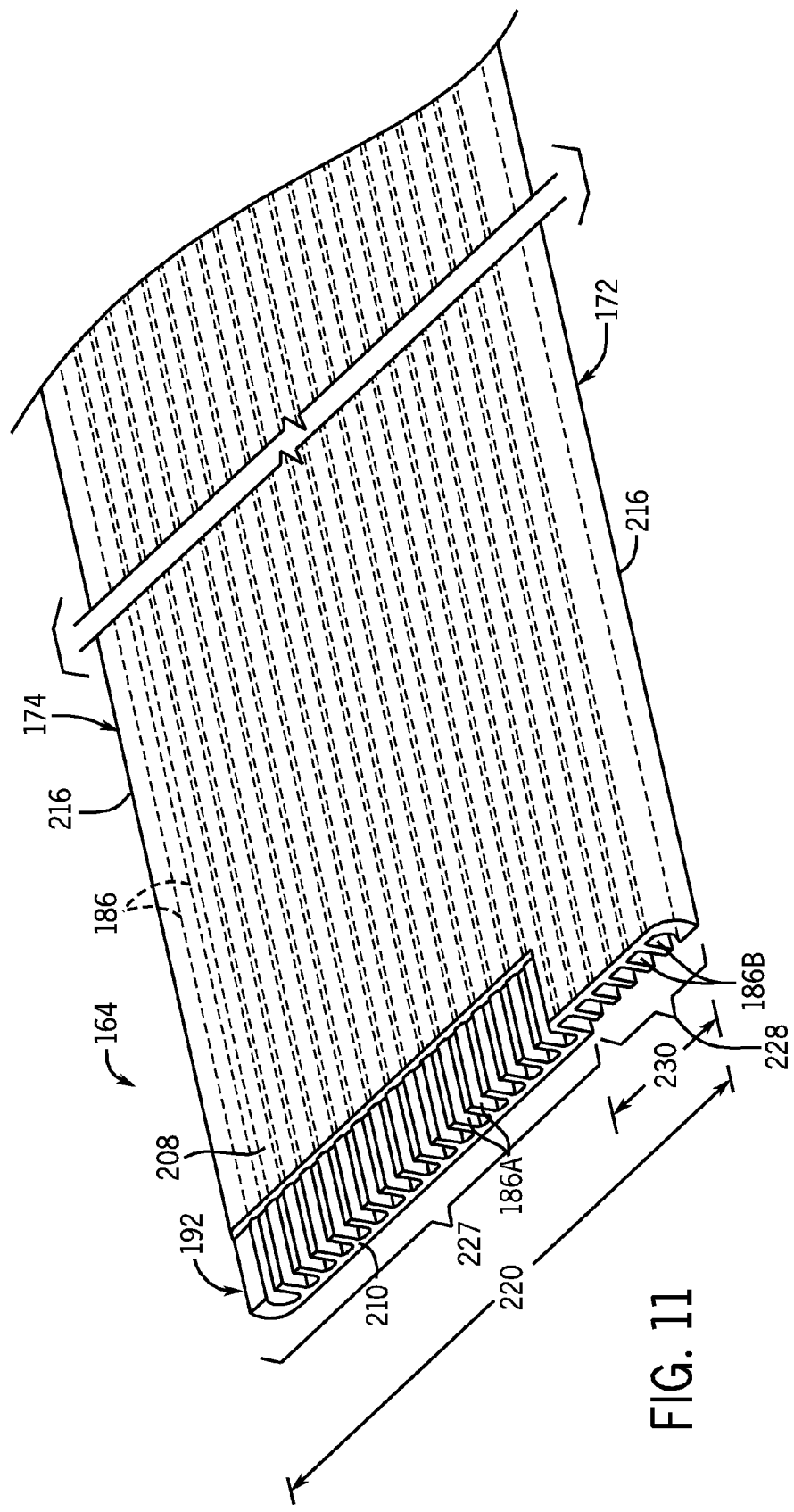
FIG. 11 is a perspective view of another embodiment of a multichannel tube that may be employed in the heat exchanger of FIG. 6.

FIG. 11 depicts another embodiment of multichannel tube 164. In this embodiment, flow path inlet section 192 includes a first section 227 where a portion of the bottom wall 210 has been removed and a second section 228 where a portion of the top wall 208 has been removed. As shown, second section 228 extends across approximately 25 percent of width 220 while first section 227 extends across approximately 75 percent of width 220. However, in other embodiments, second section 228 may extend across approximately 0 to 100 percent of width 220, and the width of first section 227 may be adjusted accordingly. Moreover, in certain embodiments, second section 228 may extend across the entire width 220 and first section 227 may be omitted. According to certain embodiments the width 230 of second section 228 may be designed to be proportional to the percentage of vapor phase refrigerant entering manifold 70 and/or entering the corresponding distribution chamber 206. However, in other embodiments, the width 230 of second section 228 may vary.

Within first section 227, the flow paths 186A are exposed on the top of multichannel tube 164, which may promote the flow of liquid phase refrigerant and/or mixed phase refrigerant into flow paths 186A. Within second section 228, the flow paths 186B are exposed on the bottom of multichannel tube 164, which may promote the flow of vapor phase refrigerant into flow paths 186B. According to certain embodiments, second section 228 may be located adjacent to the leading edge 172 of multichannel tube 164, while first section 227 is located adjacent to the trailing edge 174 of multichannel tube 164. However, in other embodiments, the relative locations of first and second sections 227 and 228 may vary. Further, in certain embodiments, multiple first and/or second sections 227 and 228 may be included within a multichannel tube 164. In certain embodiments, alternating first and second sections 227 and 228 may be included along the width 220 of a multichannel tube 164, and the first and second sections may have the same or varying widths. Moreover, in other embodiments, a multichannel tube 164 may include one or more sections in the flow path inlet section 192 where the top and bottom walls 208 and 210 are both removed. Refrigerant may pass through the multichannel tube 164 in these sections to allow fluid communication between adjacent distribution chambers 206. According to certain embodiments, sections where the top an bottom walls 208 and 210 are both removed may be intermixed with first and/or second sections 227 and 228 along the width of a multichannel tube.

Figure 12:
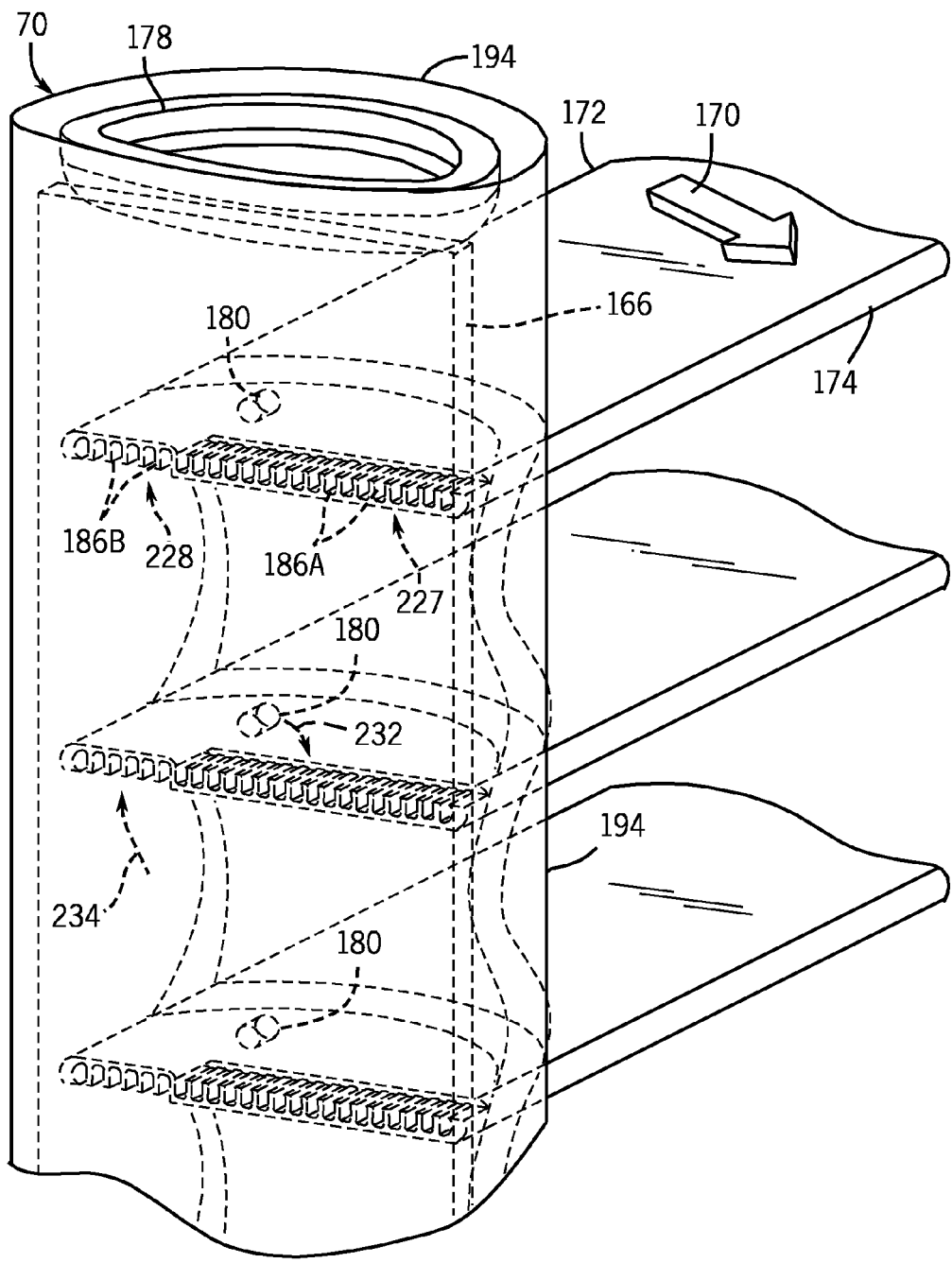
FIG. 12 is a perspective view of a portion of the heat exchanger of FIG. 6 employing the multichannel tube of FIG. 11.

FIG. 12 depicts multichannel tubes 164 of FIG. 11 shown within inlet manifold 70. Refrigerant may flow through orifices 180 from inlet section 188 to distribution chambers 206 within distribution section 190. Within distribution chambers 206, all or some of the liquid and vapor phase refrigerant may separate to enter different flow paths 186A and 186B. For example, the liquid phase refrigerant may generally flow downwards as indicated by arrows 232 to enter flow paths 186A of multichannel tubes 164. The vapor phase refrigerant may flow upwards as indicated by arrows 234 to enter flow paths 186B of multichannel tubes 164. Accordingly, flow paths 186B may receive primarily vapor phase refrigerant while flow paths 186A receive primarily liquid phase refrigerant. In these embodiments, the vapor phase refrigerant flow paths 186B may be located near the leading edges 172 of tubes 164, while the liquid phase flow paths 186A are located near trailing edges 174 of tubes 164. In certain embodiments, directing the vapor phase refrigerant through the flow paths 186B located near the leading edges 182 may inhibit the formation of frost at the leading edges 172 of tubes 164. However, in other embodiments, the relative locations of the first and second sections 227 and 228 may vary. Further, in certain embodiments, multiple first and/or second 227 and 228 may be alternated along the width 220 of a multichannel tube 164.

Figure 13:
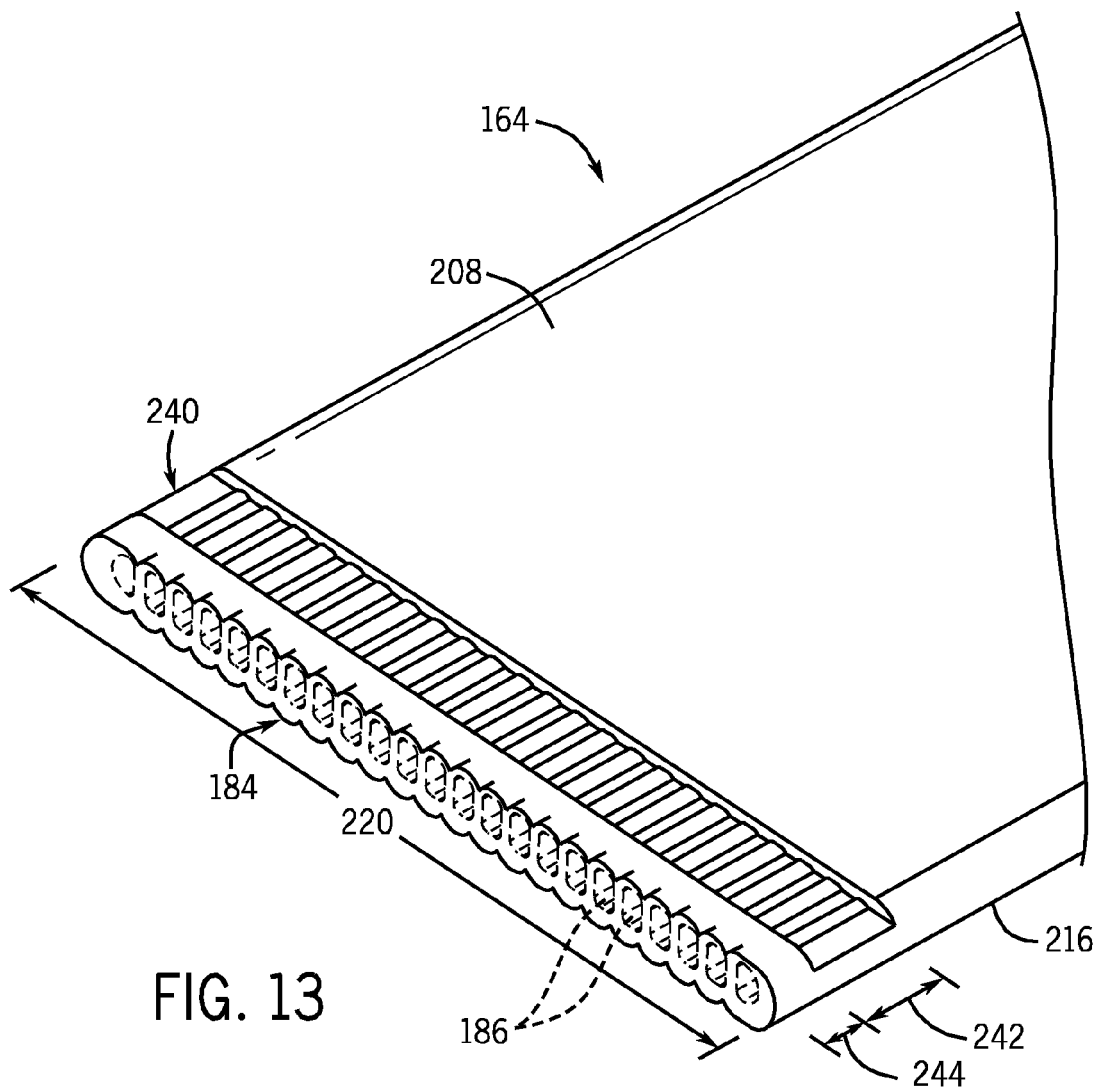
FIG. 13 is a perspective view of another embodiment of a multichannel tube that may be employed in the heat exchanger of FIG. 6.

FIG. 13 depicts another embodiment of a multichannel tube 164 that includes a flow path inlet section 240 spaced from the end 184 of multichannel tube 164. Within inlet section 240, the top wall 208 has been removed along the entire width 220 of tube 164. However, rather than being disposed adjacent to the end 184, distribution section 240 is spaced from the end 184 by a distance 244. In certain embodiments, distance 244 may be approximately 5 to 80 percent of the insertion depth 204. However, in other embodiments, distance 244 may vary. Further, in certain embodiments, the top wall 208 may not be removed along the entire width 220 and portions of bottom wall 210 may be removed in these sections. However, in other embodiments, bottom wall 210 may extend along the entire width of tube 164 within a flow path inlet section 240. Further, in certain embodiments, both the top wall 208 and the bottom wall 210 may be removed within at least a portion of an inlet section 240. In yet other embodiments, multiple inlet sections 240 may be spaced apart from one another within a multichannel tube 164 along the width and/or along the length of the multichannel tube. In certain embodiments, one or more inlet sections may have the top wall 208 removed while one or more other inlet sections may have the bottom wall 210 removed.

As shown in FIG. 13, the ends of the flow paths 186 are closed, which may inhibit the flow of brazing material into the flow paths 186 during the brazing process. According to certain embodiments, the ends of the flow paths 186 may be closed during the tube cutting or shearing process. Although the ends of the flow paths 186 are shown as completely closed, in other embodiments, the ends of the flow paths 186 may be partially closed or may be partially or completely open. Further, in certain embodiments, the edges of tube end 184 may be straight, rather than curved.

Figure 14:
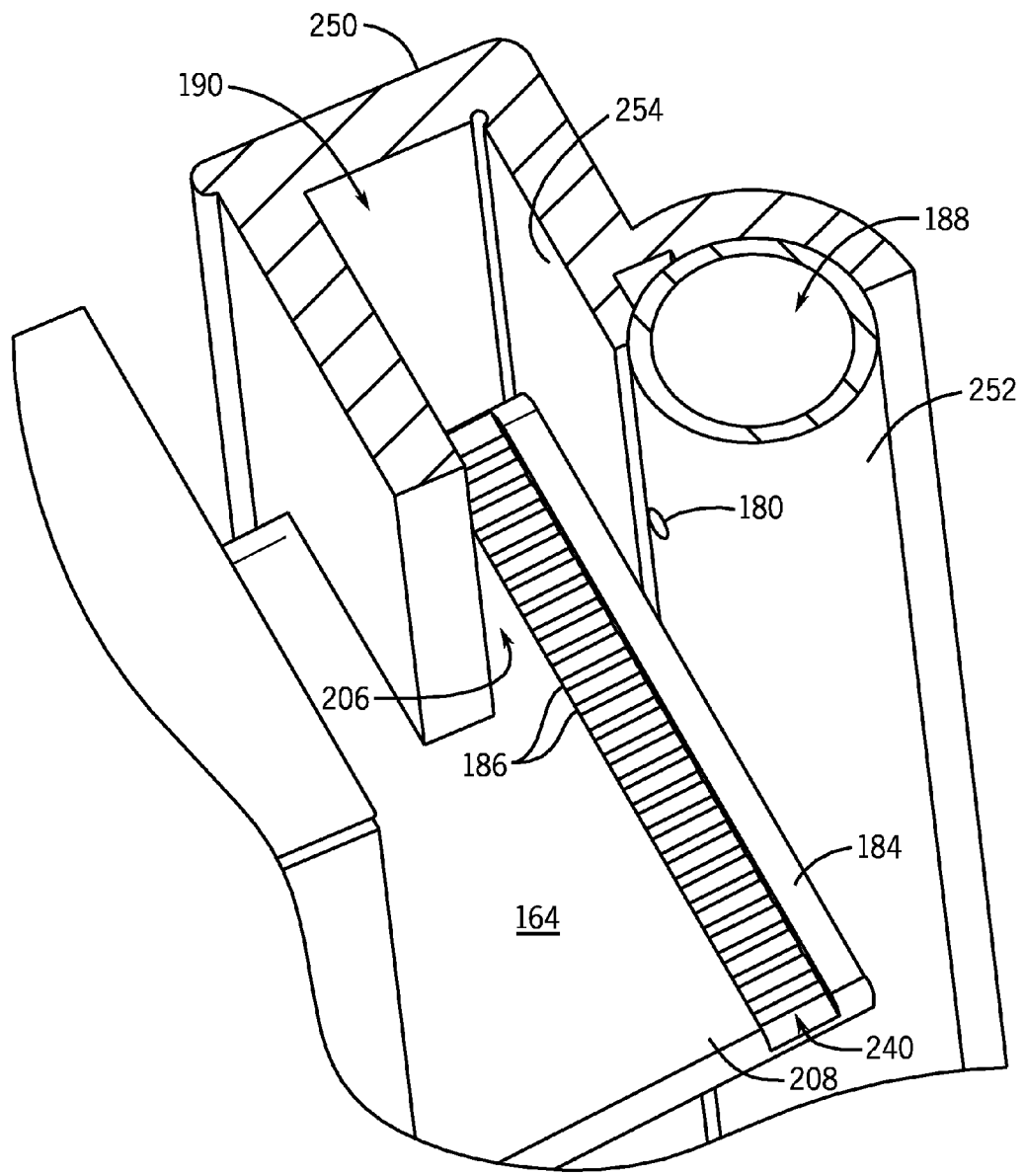
FIG. 14 is a perspective view of another embodiment of an inlet manifold that may be used in a heat exchanger employing multichannel tubes with flow path inlet sections.

FIG. 14 depicts another embodiment of an inlet manifold 250 that may employ the multichannel tubes 164 shown in FIG. 13. Further, in other embodiments, inlet manifold 250 may be employed in conjunction with the multichannel tubes 164 shown in FIGS. 10 and 11. As shown in FIG. 14, a portion of the manifold 250 is cut away to show the interior of manifold 250. Manifold 250 may be a generally rectangular shaped manifold with an internal distributor tube 252 that may form inlet section 188. In certain embodiments, manifold 250 may be extruded and distributor tube 252 may be secured within manifold 250, for example, by brazing. However, in other embodiments, distributor tubes 252 may be an integral part of manifold 250.

Distributor tube 252 includes orifices 180 that are disposed above each multichannel tube 164 to allow refrigerant to flow from inlet section 188 to the distribution section 190 of manifold 250. Distributor tube 252 may have a relatively small cross-sectional area to promote turbulent mixed phase flow of the vapor and liquid refrigerant. The mixed phase refrigerant may flow through distributor tube 252 along the length of manifold 250. The refrigerant may exit distributor tube 252 through orifices 180 to enter distribution chambers 206 within distribution section 190.

As described above with respect to FIG. 9, the distribution chambers 206 may be generally defined by a pair of multichannel tubes 164 and inlet manifold 250. Multichannel tubes 164 extend within distribution section 190 to abut distributor tube 252 and vertically partition distribution section 190 into the distribution chambers 206. Further multichannel tubes 164 also may abut a rear wall 254 of manifold 250. The interface between the ends 184 of the multichannel tubes 164 and rear wall 254 and distributor tube 252 may inhibit the flow of refrigerant into the ends 184 of multichannel tubes 164. Accordingly, within inlet section 192, refrigerant may enter multichannel tubes 164 through distribution sections 240, rather than through ends 184. As shown, the refrigerant may enter distribution sections 240 through the top of multichannel tubes 164 where the top wall 208 (FIG. 13) has been removed. Further, in certain embodiments, a portion of the bottom wall 210 may be removed to allow refrigerant to enter distribution sections 240 through the bottom of the multichannel tubes. From distribution section 240, the refrigerant may flow through flow paths 186 of multichannel tube 164 to the outlet manifold.

Figure 15:
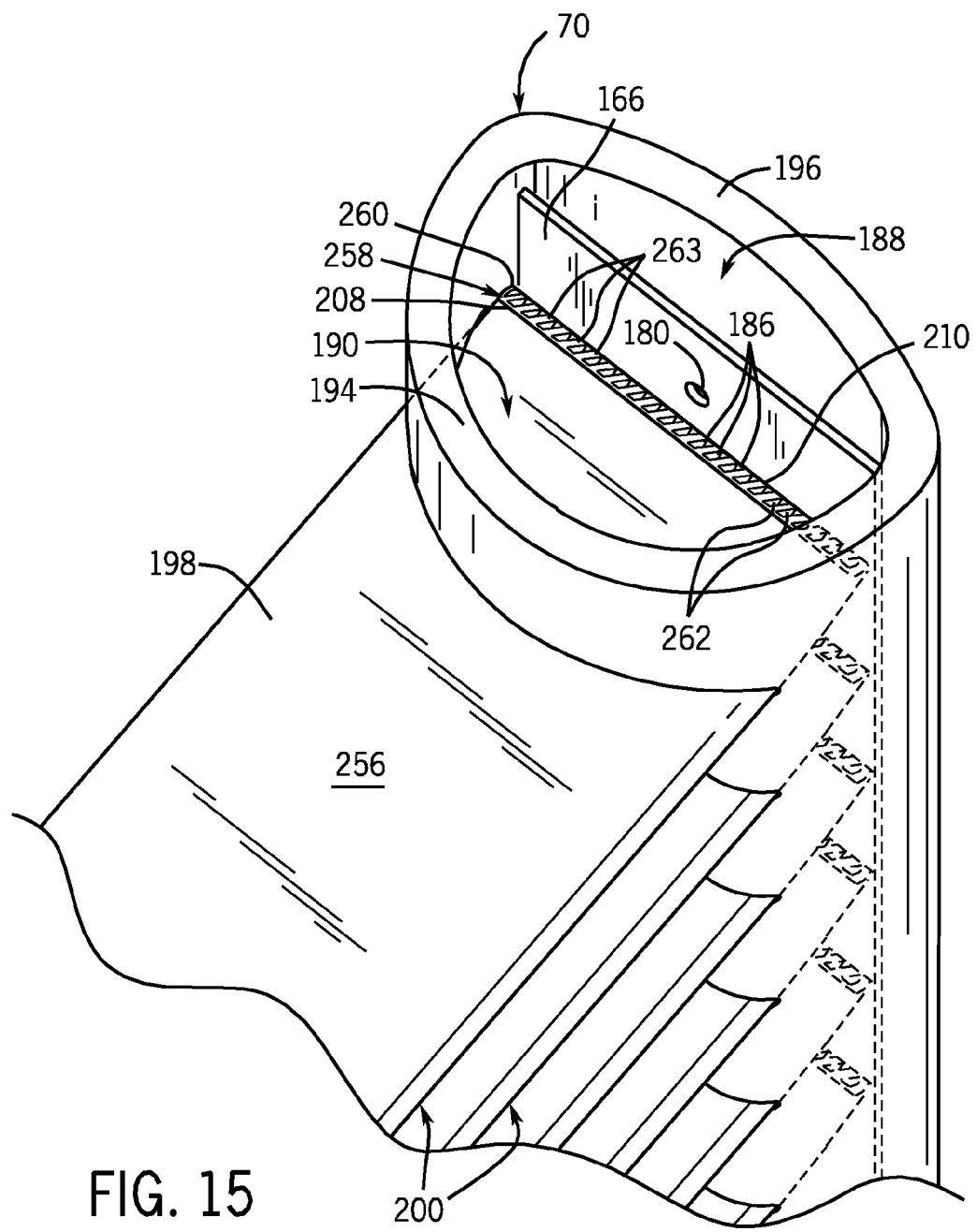
FIG. 15 is a top perspective view of a portion of the heat exchanger of FIG. 6 employing another embodiment of multichannel tubes with flow path inlet sections.

FIG. 15 depicts another embodiment of multichannel tubes that may be employed to form distribution chambers 206 (FIG. 9) within the inlet manifold 70. Similar to the multichannel tubes 164 described above with respect to FIGS. 8 and 9, multichannel tubes 256 extend into distribution section 190 to abut distribution plate 166. Multichannel tubes 256 include flow path inlet sections 258 that allow refrigerant to enter the multichannel tubes 256 through the top of the tubes. However, rather than including relatively straight ends, multichannel tubes 256 include slanted ends 260 that form the flow path inlet sections 258. In particular, as discussed further below with respect to FIG. 16, the bottom wall 210 extends past the top wall 208 and abuts the distribution plate 166, while the top wall 208 is spaced from the distribution plate 166. Further, partitions 262 that separate the flow paths 186 include angled ends 263 that connect the top wall 208 and the bottom wall 210 at the slanted end 260. Accordingly, the refrigerant enters multichannel tubes 256 through the exposed portions of the flow paths 186 that do not abut the distribution plate 166.

As shown in FIG. 15, the multichannel tubes 256 are disposed within the distribution section 190 so that the slanted end 260 faces upward to allow refrigerant to enter the flow paths 186 through the top of the multichannel tubes 256. However, in other embodiments, one or more of the multichannel tubes 256 may be rotated by approximately 180 degrees and disposed within the distribution section 190 so that the slanted end 260 faces downward to allow refrigerant to enter the flow paths 186 through the bottom of the multichannel tube 256. Further, in yet other embodiments, the multichannel tubes 256 may be employed in another type of manifold, such as the manifold 250 described above with respect to FIG. 14.

Figure 16:
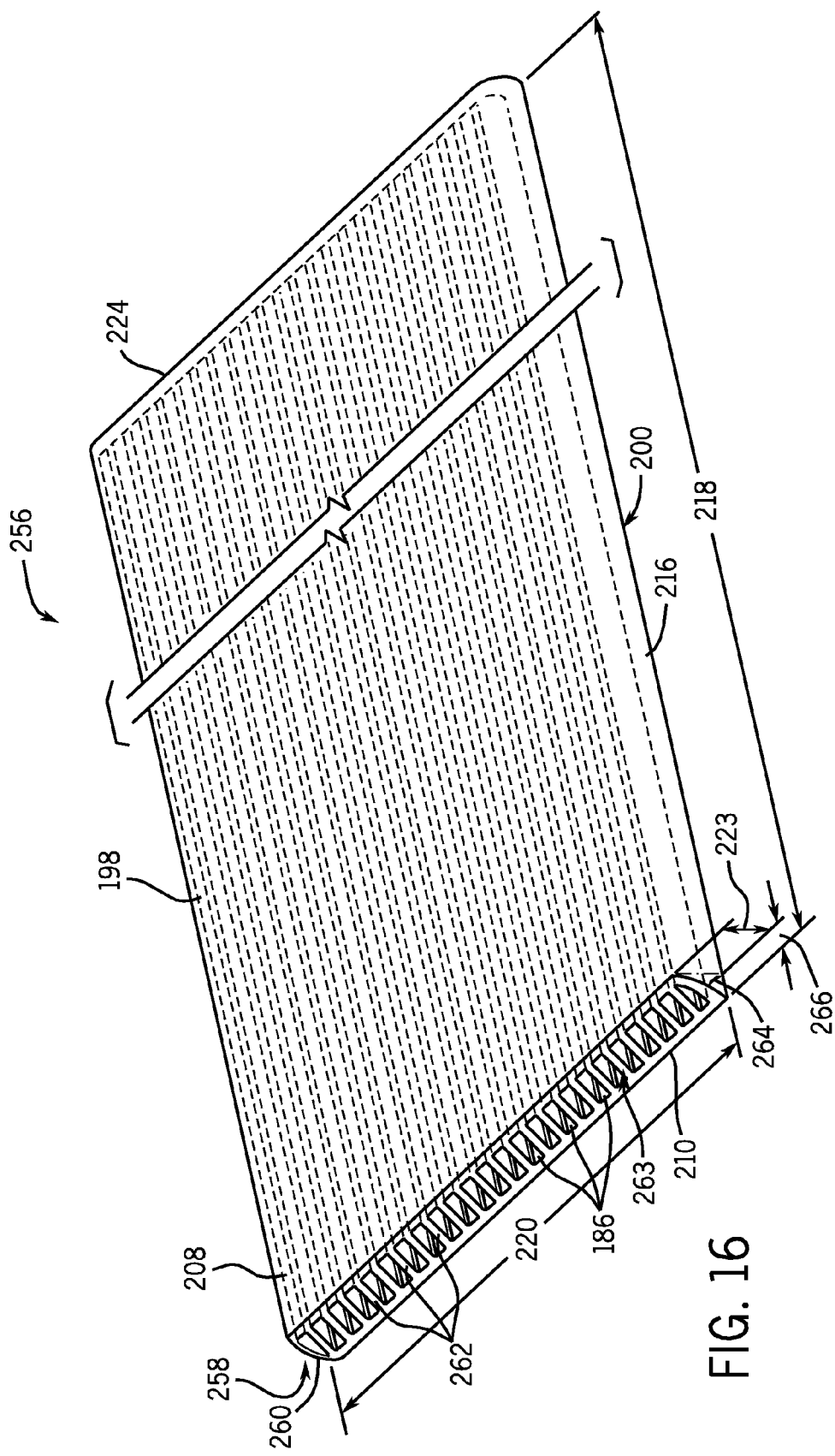
FIG. 16 is a perspective view of the multichannel tube of FIG. 15.

FIG. 16 is a perspective view of one of the multichannel tubes 256. Outer wall 198 extends between ends 260 and 224 of multichannel tube 256 and generally encircles the cross section of multichannel tube 256. Multichannel tube 256 has an outer wall 198 that includes top wall 208, bottom wall 210, and the pair of side walls 216 that connect top wall 208 and bottom wall 210. The top wall 208 and the bottom wall 210 extend generally parallel to one another, and the side walls 216 curve outward from the top and bottom walls. Partitions 262 extend generally parallel to one another along the length 218 of the tube to divide the tube into flow paths 186. According to certain embodiments, the partitions 262 extend generally perpendicular to the top and bottom walls 208 and 210. However, in other embodiments, the partitions may be slanted with respect to the top and bottom walls. As shown, multichannel tube 256 has an oblong cross section. However, in other embodiments, multichannel tube 256 may have another suitable cross-section shape, such as a rectangular cross section, among others At the slanted end 260, a portion of the outer wall 198, as well as a portion of the partitions 262, has been removed so that the slanted end 260 and the partitions 262 extend at an angle 264 with respect to the bottom wall 210 to form the inlet section 258. According to certain embodiments, the angle 264 may be approximately 30 to 70 degrees, and all subranges therebetween, or more specifically, approximately 45 degrees. As discussed further below with respect to FIGS. 17 and 18, in certain embodiments, the slanted end 260 may be formed by cutting a tube length at an angle along the width 220 of the tube. As shown, the opposite end 224 is a straight end that extends generally perpendicular to the top and bottom walls 208 and 210. However, in other embodiments, the opposite end also may be slanted. For example, in certain embodiments, the opposite end 224 may be slanted so that the end is generally parallel to the slanted end 260.

As shown, inlet section 258 extends completely across the width 220 of multichannel tube 256. Further, the bottom wall 210 extends past the top wall 208 at a distance 266. According to certain embodiments, the distance 266 may be approximately 0.5 to 5 times the height 223 of the flow paths 186, and all subranges therebetween. However, in other embodiments, the distance 266 that the bottom wall 210 is offset from the top wall 208 may vary. Further, the distance 266 may be approximately equal to or less than the insertion depth 204 (FIG. 9) of multichannel tube 256 within distribution section 190. As shown in FIG. 16, multichannel tube 256 also includes an end 224 that is substantially straight. However, in other embodiments, end 224 may be replaced by a slanted end 260. Further, in certain embodiments, top wall 208 and/or bottom wall 210 may include additional inlet flow path sections 192 or 240, as described above with respect to FIGS. 8 to 14. For example, in certain embodiments, a portion of bottom wall 208 may be removed at the slanted end 260 to allow refrigerant to enter the flow paths 186 through the bottom of the tube 256, as well as through the top of the tube 256.

Figure 17:
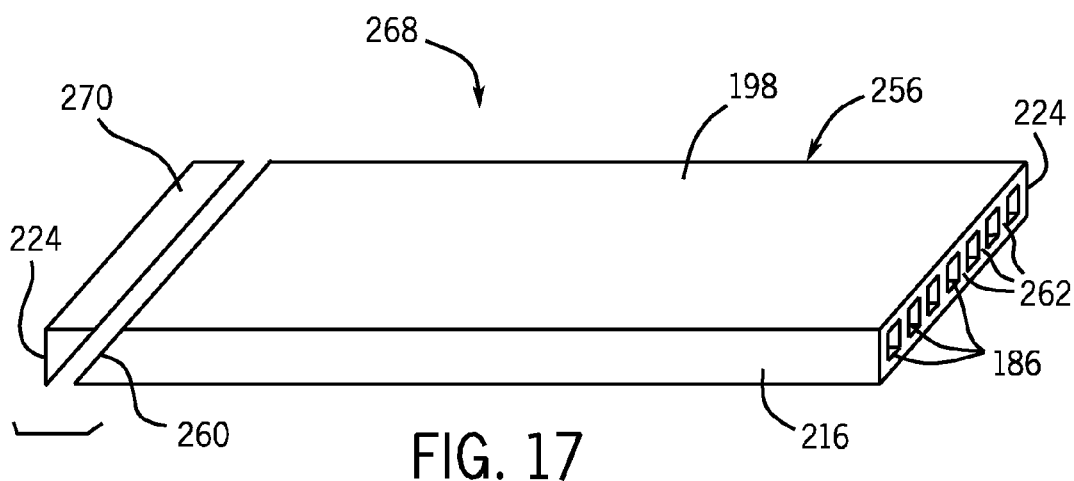
FIG. 17 is perspective view of a tube length that may be manufactured to form the multichannel tube of FIG. 16.
Figure 18:
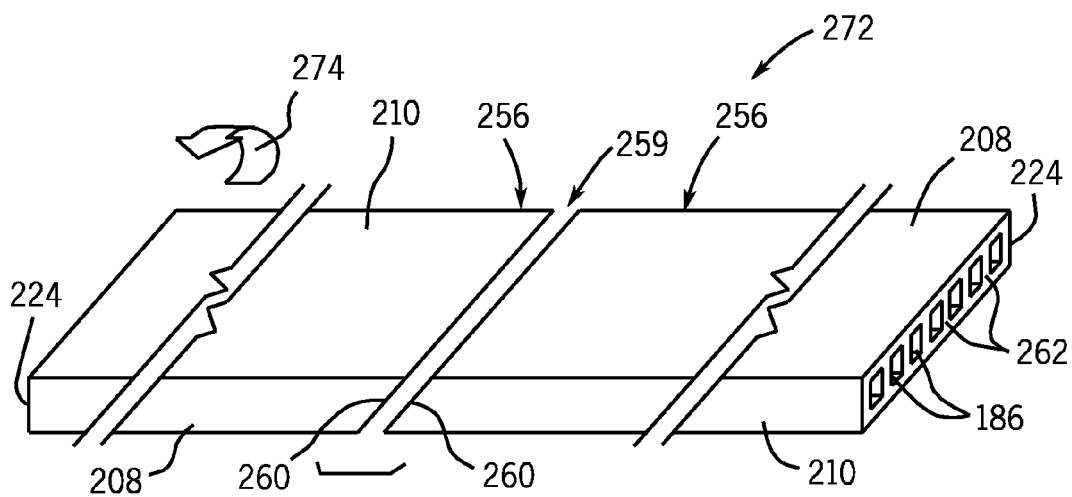
FIG. 18 is a perspective view of a tube length that may be separated into two tubes for use in the multichannel heat exchanger of FIG. 6.
Figure 19:
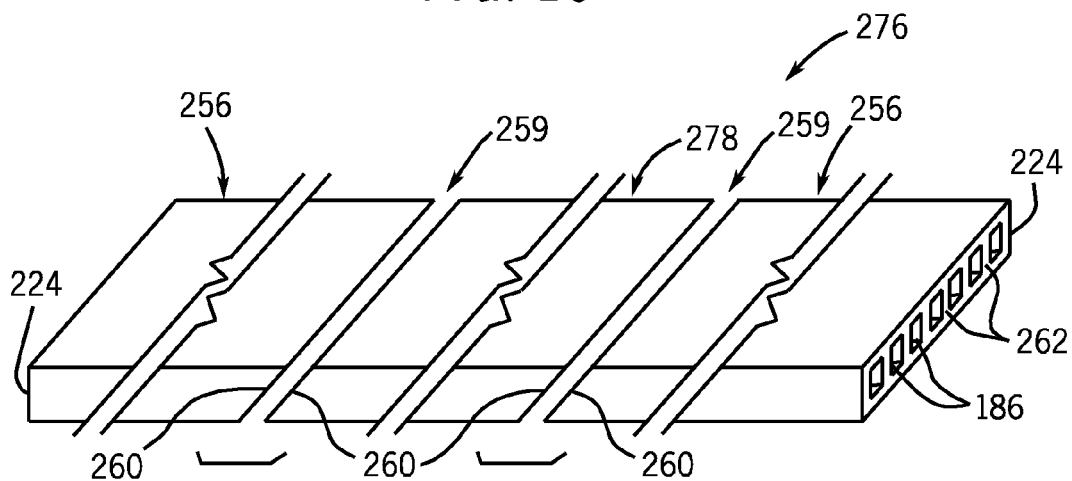
FIG. 19 is a perspective view of a tube length that may be separated into three or more tubes for use in the multichannel heat exchanger of FIG. 6.

FIGS. 17 to 19 depict tube lengths that may be manufactured to form one or more multichannel tubes with slanted ends 260. For example, as shown in FIG. 17, a tube length 268 that has two generally straight ends 224 can be cut, or sheared, crosswise at an angle to remove an end portion 270. After removal of end portion 270, the multichannel tube 256 includes the slanted end 260 that can be inserted within a manifold 70 to form a distribution chamber. In another example, as shown in FIG. 18, a tube length 272, which also has two generally straight ends 224, can be cut, or sheared, crosswise at an angle to form two multichannel tubes 256. Further, in certain embodiments, the tube length 272 may be scored crosswise at an angle to form a separation point 259 that defines the slanted ends 260. The tube length 272 may then be pulled apart or separated to form the two multichannel tubes 256. After separation, one of the multichannel tubes 256 may be rotated approximately 180 degrees, as indicated by the arrow 274, so that the bottom wall 210 is facing downwards. The slanted ends 260 of the tubes 256 can then be inserted within a manifold 70 to form distribution chambers, as described above with respect to FIG. 15.

FIG. 19 depicts a tube length 276 that also may be manufactured to form multichannel tubes with slanted ends 260. According to certain embodiments, the tube length 278 may be scored crosswise at an angle in multiple locations to form separation points 259 that define the slanted ends 260. However, in other embodiments, the tube length 278 may be cut, or sheared, crosswise at an angle to form the separation points 259. The tube length 278 may then be pulled apart or separated at each of the separation points 259 to form the multichannel tubes 256 and 278. As discussed above, the multichannel tubes 256 include a generally straight end 224 and a slanted end 260. The slanted end 260 can then be inserted within a manifold 70 to form distribution chambers, as described above with respect to FIG. 15, while the straight end 224 may be inserted in the opposite manifold 72 (FIG. 6). The multichannel tube 278 includes two slanted ends 260, and accordingly, either end 260 of the tube may be inserted within the manifold 70 to form distribution chambers. The opposite slanted end 260 may be inserted in the other manifold 72 (FIG. 6). As shown in FIG. 19, the tube length 276 has been scored in two separate locations to form three multichannel tubes. However, in other embodiments, the tube length may be scored, cut, or sheared crosswise at an angle in numerous locations to form any number of multichannel tubes.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, orientations, etc.) without materially departing from the novel teachings and advantages of the subject matter recited in the claims. For example, in other embodiments, the multichannel tubes shown in FIGS. 13 and 14 may be employed in the manifolds discussed above with respect to FIGS. 8 and 9. Further, the relative shape, geometries, and/or sizes of flow path inlet sections 192 and 240 and/or multichannel tubes 164 may vary. For example, in other embodiments, the multichannel tubes may have a rectangular cross-section. In another example, the relative lengths and/or widths of flow path inlet sections 192 and 240 may vary.

The order or sequence of any process or method steps also may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A heat exchanger tube, comprising:
at least one flow path extending along a length of the heat exchanger tube from a first end to a second end opposite of the first end;
a fluid flow section in which the at least one flow path is enclosed within the heat exchanger tube and surrounded by a top wall of the heat exchanger tube, a bottom wall of the heat exchanger tube, and a pair of partitions extending between the top wall and the bottom wall;
an inlet section in which the bottom wall of the heat exchanger tube and the pair of partitions abut the at least one flow path, wherein the top wall does not extend along the at least one flow path in the inlet section to allow fluid to flow into the at least one flow path, and wherein the inlet sections is spaced from the first end and the second end; and
a second flow path extending along the length of the heat exchanger tube from the first end to the second end, wherein a portion of the top wall is removed within the inlet sections to expose the second flow path to allow the fluid to flow into the second flow path, and the top wall is not removed for one or more flow paths disposed between the at least one flow path and the second flow path.

2. A heat exchanger tube, comprising:
a top wall;
a bottom wall disposed generally opposite from the top wall;
a pair of side walls extending between the top and bottom walls and separated by a width of the heat exchanger tube;
a plurality of generally parallel flow paths spaced from one another along the width by partitions extending between the top wall and the bottom wall, and extending along a length of the heat exchanger tube from a first end to a second end opposite of the first end, wherein the plurality of generally parallel flow paths are enclosed by the top wall, the bottom wall, and the side walls, and wherein each of the plurality of generally parallel flow paths is surrounded by the top wall, the bottom wall, and at least one partition of the partitions in a fluid flow section of the heat exchanger tube; and
an inlet section comprising a first section in which the top wall is removed along the width to expose a group of flow paths of the plurality of generally parallel flow paths within the inlet section that are defined by the bottom wall and a first set of the partitions and a second section in which the bottom wall is removed along the width to expose another group of flow paths of the plurality of generally parallel flow paths within the inlet section that are defined by the top wall and a second set of the partitions.

3. The heat exchanger tube of claim 2, wherein the bottom wall extends between the pair of side walls within the first section.

4. The heat exchanger tube of claim 2, wherein the first section comprises a slanted tube end where the bottom wall extends past the top wall.

5. The heat exchanger tube of claim 2, wherein the inlet section is disposed at the first end.

6. The heat exchanger tube of claim 2, wherein the inlet section is disposed between adjacent sections of the top wall.

7. A heat exchanger tube, comprising
- a top wall;
- a bottom wall disposed generally opposite from the top wall;
- a pair of side walls extending between the top and bottom walls and separated by a width of the heat exchanger tube;
- a plurality of generally parallel flow paths spaced from one another along the width and extending along a length of the heat exchanger tube from a first end to a second end opposite of the first end, wherein the plurality of generally parallel flow paths are enclosed by the top wall, the bottom wall, and the side walls in a fluid section of the heat exchanger tube, and are separated from one another by partitions extending along the length, and wherein each of the plurality of generally parallel flow paths is surrounded by the top wall, the bottom wall, and at least one partition of the partitions in the fluid flow sections; and
- an inlet section comprising a slanted tube end, wherein the bottom wall extends past the top wall, and wherein the partitions comprise angled ends that connect the bottom wall to the top wall within the inlet section, wherein the slanted tube end comprises a first section in which only a portion of the bottom wall is removed along a width of the inlet section to expose a group of flow paths of the plurality of generally parallel flow paths within the inlet section.

8. The heat exchanger tube of claim 7, wherein the partitions extend generally perpendicular to the bottom wall along the length of the heat exchanger tube.

9. The heat exchanger tube of claim 7, wherein the first end comprises the slanted tube end, and wherein the second end comprises an additional slanted tube end.

* * * * *